(12) United States Patent
Lavallee et al.

(10) Patent No.: US 11,235,634 B2
(45) Date of Patent: Feb. 1, 2022

(54) VEHICLE WITH AN ACTUATOR FOR ADJUSTING A LIMITER STRAP

(71) Applicant: BOMBARDIER RECREATIONAL PRODUCTS INC., Valcourt (CA)

(72) Inventors: Jean-Simon Lavallee, St-Charles-Borromee (CA); Michel Bourassa, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 387 days.

(21) Appl. No.: 16/336,257

(22) PCT Filed: Sep. 26, 2017

(86) PCT No.: PCT/IB2017/055868
§ 371 (c)(1),
(2) Date: Mar. 25, 2019

(87) PCT Pub. No.: WO2018/060860
PCT Pub. Date: Apr. 5, 2018

(65) Prior Publication Data
US 2020/0016950 A1      Jan. 16, 2020

Related U.S. Application Data

(60) Provisional application No. 62/402,153, filed on Sep. 30, 2016.

(51) Int. Cl.
*B60G 17/005*     (2006.01)
*B62D 55/07*      (2006.01)
(Continued)

(52) U.S. Cl.
CPC .......... *B60G 17/005* (2013.01); *B62D 55/07* (2013.01); *B62D 55/1083* (2013.01);
(Continued)

(58) Field of Classification Search
CPC .......... B60G 17/005; B60G 2204/4504; B62D 55/07; B62D 55/1083; B62M 27/00;
(Continued)

(56) References Cited

U.S. PATENT DOCUMENTS 4,393,953 A * 7/1983 Boulianne .............. B62M 27/02
                                                    180/190
5,265,692 A    11/1993 Mallette
(Continued)

OTHER PUBLICATIONS

International Search Report of PCT/IB2017/055868, Shane Thomas, dated Jan. 26, 2018.

*Primary Examiner* — Minnah L Seoh
*Assistant Examiner* — Harold Eric Pahlck, III
(74) *Attorney, Agent, or Firm* — BCF LLP

(57) ABSTRACT

A vehicle comprises a chassis, a seat, an endless drive track, a rear suspension assembly with at least one slide rail and a substantially inextensible limiter strap extending between the chassis and the at least one slide rail, to limit separation between the at least one slide rail and the chassis. The strap holder is moveable between a first holder position and a second holder position, a position of the end of the limiter strap being different in the first strap holder position compared to the second strap holder position. A control cable is operatively connects the strap holder to a strap adjustment actuator. The strap adjustment actuator is disposed forward of the seat and is operable by a user during operation of the vehicle, the strap adjustment actuator being movable between first and second positions related to the positions of the strap holder.

18 Claims, 20 Drawing Sheets

(51) Int. Cl.
  *B62D 55/108* (2006.01)
  *B62D 55/18* (2006.01)
  *B62M 27/02* (2006.01)
  *B62L 3/02* (2006.01)

(52) U.S. Cl.
  CPC ............ *B62D 55/18* (2013.01); *B62M 27/02* (2013.01); *B60G 2204/4504* (2013.01); *B60G 2300/322* (2013.01); *B62L 3/023* (2013.01); *B62M 2027/026* (2013.01)

(58) Field of Classification Search
  CPC ............ B62M 27/02; B62M 2027/021; B62M 2027/022; B62M 2027/023; B62M 2027/025; B62M 2027/026; B62M 2027/027; B62M 2027/028; B62K 11/14; B62K 23/02
  See application file for complete search history.

(56) References Cited

U.S. PATENT DOCUMENTS

| | | | |
|---|---|---|---|
| 5,692,579 | A | 12/1997 | Peppel et al. |
| 5,881,834 | A | 3/1999 | Karpik |
| 6,206,124 | B1 | 3/2001 | Mallette et al. |
| 6,234,264 | B1 | 5/2001 | Boivin et al. |
| 8,525,793 | B2 | 9/2013 | Sentchenkoff et al. |
| 8,910,738 | B2 * | 12/2014 | Mangum ................ B62M 27/02 180/193 |
| 9,022,156 | B2 | 5/2015 | Bedard et al. |
| 9,114,852 | B2 | 8/2015 | Fecteau et al. |
| 2005/0016784 | A1 | 1/2005 | Fecteau |
| 2012/0166043 | A1 | 6/2012 | Watson |
| 2013/0285339 | A1 * | 10/2013 | Bedard ................ B62D 55/108 280/28.5 |
| 2014/0013875 | A1 * | 1/2014 | Neeley ..................... F16C 1/12 74/89 |
| 2015/0232140 | A1 | 8/2015 | Bedard et al. |

* cited by examiner

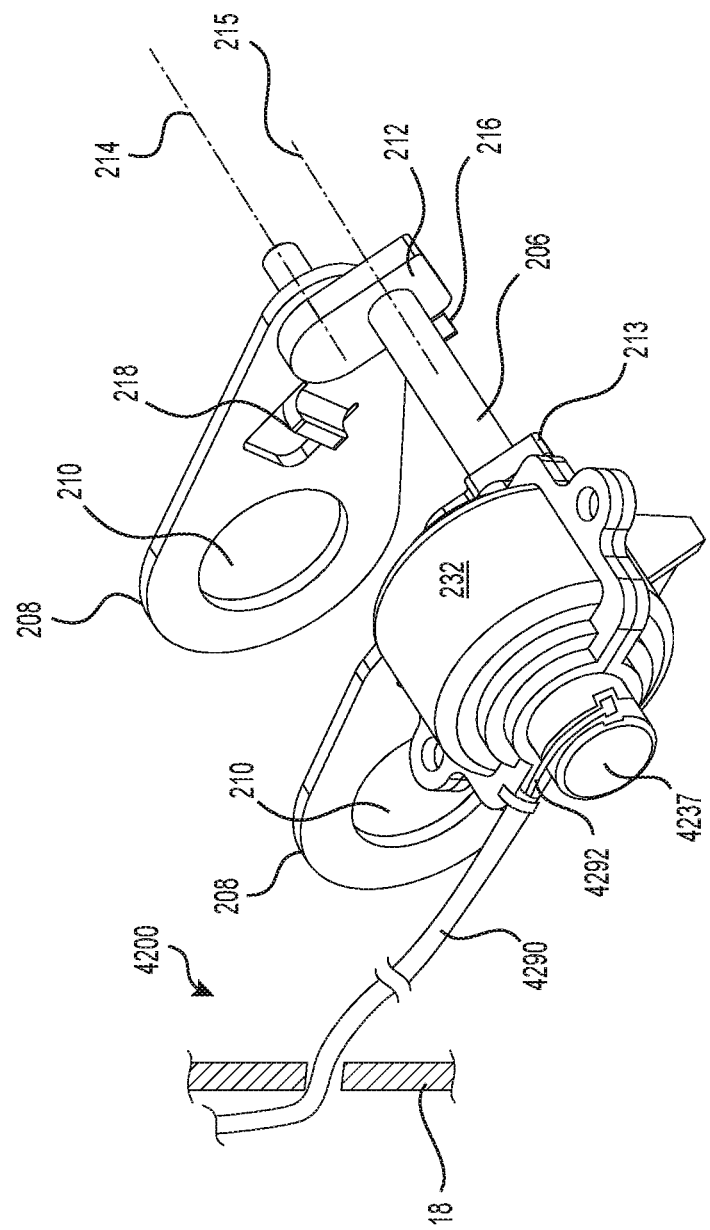

VEHICLE WITH AN ACTUATOR FOR ADJUSTING A LIMITER STRAP

CROSS-REFERENCE

The present application claims priority to U.S. Provisional Patent Application No. 62/402,153, entitled "Vehicle with an Actuator for Adjusting a Limiter Strap," filed Sep. 30, 2016, the entirety of which is incorporated herein by reference.

FIELD OF TECHNOLOGY

The present technology relates generally to a vehicle with an actuator for adjusting a limiter strap.

BACKGROUND

Snowmobiles are designed for travel on a variety of surfaces and terrains, rough and smooth, soft and rigid, level, and inclined upwards or inclined downwards. While the snowmobile engine drives the snowmobile, its suspension system provides stability and control for proper operation of the snowmobile. The suspension system is additionally designed to provide cushioning from the unevenness of the surface being travelled upon, and thereby, to provide a comfortable riding experience. Snowmobiles and snowmobile suspension systems are generally adapted for different uses, such as for utility or for recreation. The configuration of a snowmobile and its suspension system can also be optimized for different riding conditions, such as terrain roughness, inclination and other trail conditions.

A versatile snowmobile should be usable by different users in different riding conditions. It is therefore desirable to have a snowmobile, with adjustable suspension configurations, so that the snowmobile can be optimized for different riding conditions. One structure that can be used for suspension adjustment is a limiter strap, which acts to limit separation between a chassis of the snowmobile and rails of its rear suspension, that separation being limited to different extents depending on the configuration of the limiter strap.

Further, riding conditions such as snow conditions and/or terrain roughness may change during operation of the snowmobile for from one day to the next. The user may wish to adjust the suspension system without stopping, dismounting or dissembling components of the snowmobile. It is therefore desirable for the user to be able to make the adjustment during operation of the snowmobile.

Therefore, there is a need for a limiter strap adjustment system for adjusting a limiter strap of a rear suspension assembly of a snowmobile which can be adjusted by the user during operation of the snowmobile.

SUMMARY

It is an object of the present technology to ameliorate at least some of the inconveniences present in the prior art.

In according to one aspect of the present technology, there is provided a vehicle, comprising a chassis; at least one seat connected to the chassis; a motor connected to the chassis; an endless drive track disposed below the chassis, the endless drive track being operatively connected to the motor for propulsion of the vehicle; a rear suspension assembly supporting the endless drive track, the rear suspensions assembly comprising a left slide rail; a right slide rail; at least one suspension arm pivotally connected to one of the left and right slide rails and pivotally connected to the chassis; a shock absorber connected between the chassis and the one of the left and right slide rails; a limiter strap extending between the chassis and the one of the left and right slide rails, the limiter strap being substantially inextensible to limit separation between the one of the left and right slide rails and the chassis; a strap holder connected between an end of the limiter strap and one of the one of the left and right slide rails, and the chassis, the strap holder being moveable between a first holder position and a second holder position, a position of the end of the limiter strap being different in the first strap holder position compared to the second strap holder position; a control cable having a first end operatively connected to the strap holder of the rear suspension assembly; and a strap adjustment actuator operatively connected to a second end of the control cable, the strap adjustment actuator being disposed forward of the at least one seat, the strap adjustment actuator being operable by a user during operation of the vehicle, the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions.

In some implementations, when the limiter strap is taut the strap holder is prevented from moving from the first strap holder position to the second strap holder position; and the strap holder is movable from the second strap holder position to the first strap holder position.

In some implementations, when the limiter strap is taut the strap holder is prevented from moving from the first strap holder position to the second strap holder position; and the strap holder is prevented from moving from the second strap holder position to the first strap holder position.

In some implementations, the vehicle further comprises a biasing member; and wherein a first end of the biasing member is operatively connected to the strap holder; moving the strap holder toward the second strap holder position compresses the biasing member; and the biasing member biases the strap holder toward the first strap holder position.

In some implementations, the biasing member is a torsion spring having a torsion axis; and a first end of the torsion spring is connected to the strap holder.

In some implementations, the vehicle further comprises a rotating cylinder connected to the first end of the control cable on a first side of the rotating cylinder; a lever having a first end and a second end, the first end of the lever being connected to a second side of the rotating cylinder; and a rigid member having a first end and a second end, the first end of the rigid member being connected to the second end of the lever, the second end of the rigid member being connected to the strap holder.

In some implementations, the chassis includes a tunnel, the rear suspension assembly being connected the tunnel; and the rotating cylinder is received in an opening in a side wall of the tunnel, the rotating cylinder extending at least partially into an interior of the tunnel.

In some implementations, the vehicle further comprises a handlebar connected to the chassis; and wherein the strap adjustment actuator is a twist grip actuator disposed on the handlebar; and the twist grip actuator is movable between at least the first actuator position and the second actuator position by twisting the twist grip actuator about the handlebar.

In some implementations, the vehicle further comprises a left handle disposed on a left side portion of the handlebar; a brake lever disposed on the left side portion, the brake lever being connected to a brake fluid reservoir, the brake fluid reservoir being connected to the handlebar rightward of the left handle; a right handle disposed on a right side portion of the handlebar; a throttle lever disposed on the right side portion, a left end portion of the throttle lever being connected to the handlebar leftward of the right handle; and wherein the twist grip actuator is disposed between one of the left handle and the brake fluid reservoir, and the right handle and the left end portion of the throttle lever.

In some implementations, the vehicle further comprises a handle disposed on a side portion of the handlebar; and wherein the twist grip actuator is disposed on the handlebar laterally inward of the handle.

In some implementations, the twist grip actuator is less than 5 cm from a laterally inward edge of the handle.

In some implementations, the vehicle further comprises a handlebar riser disposed between the handlebar and the chassis; and at least one body panel connected to the chassis; and wherein the control cable runs from the twist grip actuator, along the handlebar, along the handlebar riser and in an interior of the at least one body panel to the strap holder.

In some implementations, the vehicle further comprises a handlebar connected to the chassis; and wherein the strap adjustment actuator is a lever actuator disposed on the handlebar; and the lever actuator is movable between at least the first actuator position and the second actuator position by at least one of pushing the lever actuator, and pulling the lever actuator.

In some implementations, the vehicle further comprises at least one body panel connected to and disposed above the chassis; and wherein the strap adjustment actuator is connected to the at least one body panel.

In some implementations, the vehicle further comprises a handlebar riser connected to the chassis; and wherein the strap adjustment actuator is disposed on the handlebar riser.

In some implementations, the vehicle further comprises at least one body panel; and wherein a portion of the control cable is disposed in an interior side of the at least one body panel.

In some implementations, the strap holder is connected between the end of the limiter strap and one of the at least one suspension arm.

In some implementations, the vehicle is a snowmobile; the chassis includes a tunnel, the rear suspension assembly being connected to the tunnel; and the vehicle further comprises a front right ski connected to a front right portion of the chassis; and a front left ski connected to a front left portion of the chassis.

In some implementations, the control cable is disposed on an exterior side of a tunnel wall of the tunnel; and the strap holder is disposed in an interior of the tunnel.

In some implementations, the vehicle further comprises at least one body panel; and wherein the tunnel includes at least one tunnel side wall; and the control cable runs from the strap adjustment actuator, into an interior of the at least one body panel and along an exterior of the at least one tunnel side wall.

In some implementations, the at least one seat includes a straddle seat disposed on the chassis; and wherein the strap holder actuator is disposed forward of the straddle seat.

For purposes of the present application, terms related to spatial orientation when referring to the snowmobile and components in relation to the snowmobile, such as "forward", "rearward", "left", "right", "above" and "below", are as they would be understood by a user of the snowmobile sitting thereon in a normal riding position, with the snowmobile in a straight ahead orientation (i.e. not steered left or right), and in an upright position (i.e. not tilted). When referring to a component alone, terms related to spatial orientation are described with respect to the component as disposed on the snowmobile. The explanations provided above regarding the above terms take precedence over explanations of these terms that may be found in any one of the documents incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 14A is a close-up, rear, left side perspective view of a portion of a limiter strap adjustment assembly according to another implementation of the present technology, with a strap holder disposed in a raised position;

DETAILED DESCRIPTION

Although the present technology is described below with respect to a snowmobile, it is contemplated that aspects could be applied to other vehicles with suspensions supporting an endless track, including, but not limited to: side-by-side vehicles (SSVs) and all-terrain vehicles (ATVs).

Figure 1:
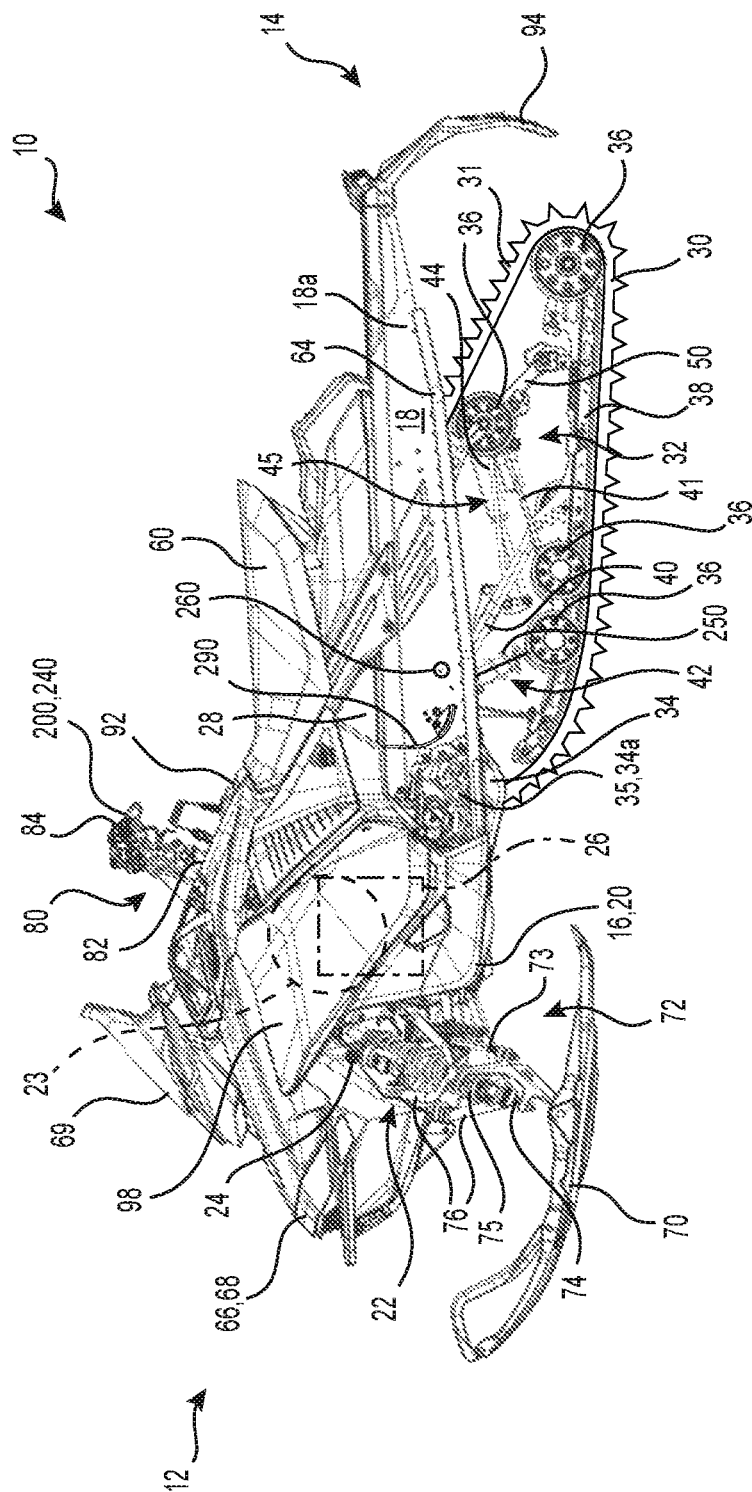
FIG. 1 is a left side elevation view of a snowmobile according to one implementation of the present technology.
Figure 2:
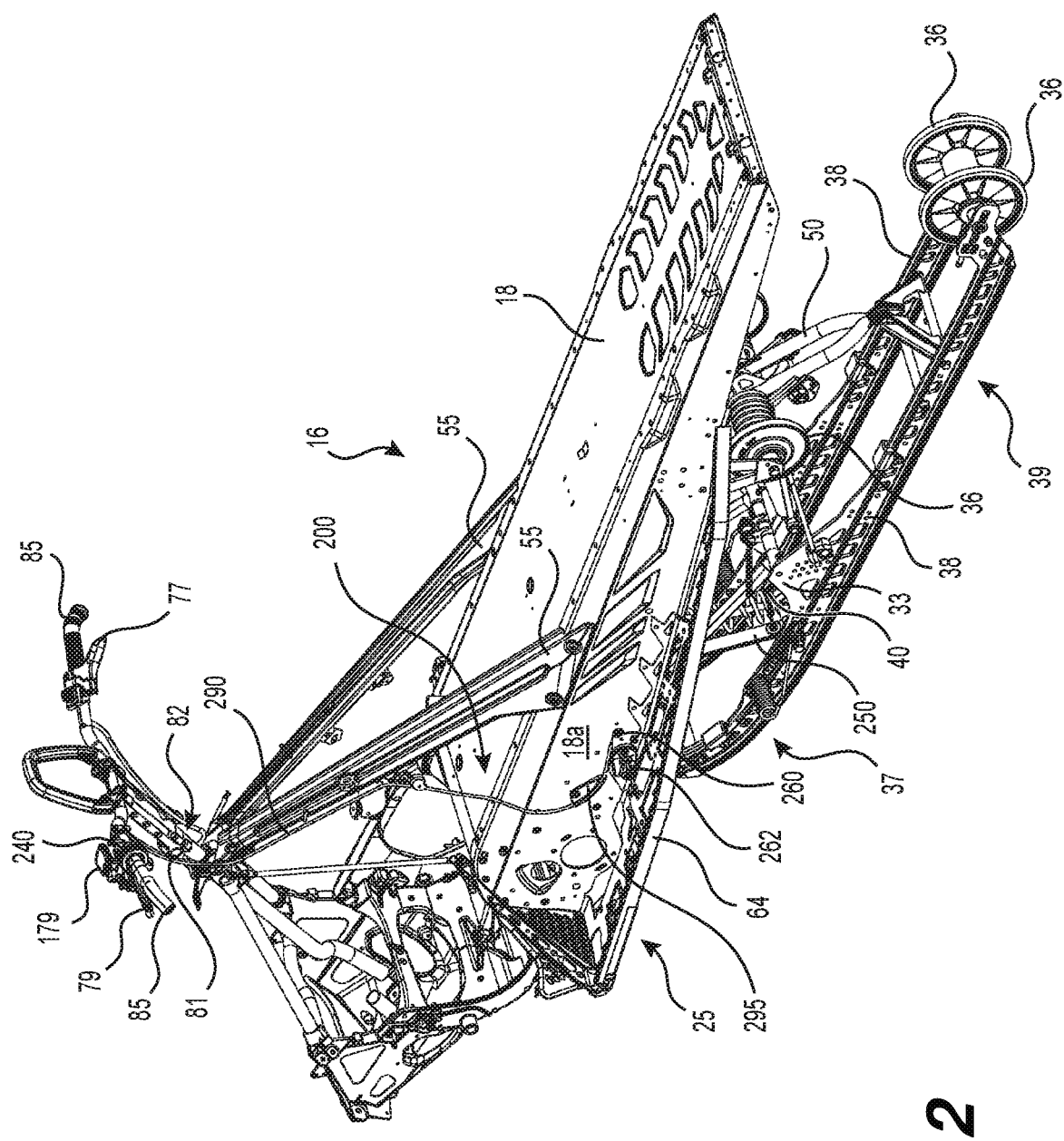
FIG. 2 is a top, rear, left side perspective view of portions of a chassis and a rear suspension assembly of the snowmobile of FIG. 1.

With reference to FIGS. 1 and 2, a snowmobile 10 includes a front end 12 and a rear end 14 which are defined consistently with a travel direction of the vehicle 10. The snowmobile 10 includes a vehicle body in the form of a frame or chassis 16 which includes a rear tunnel 18, a motor module 20, a front suspension module 22 and an upper structure 24. The tunnel 18 is formed from sheet metal parts assembled to form an inverted U-shape when viewed from the front or rear end 12, 14. The inverted U-shaped tunnel 18 has a left side portion 18a and a right side portion 18a (only the left being shown).

A motor 26, schematically illustrated in FIG. 1, is carried in an engine compartment defined by the motor module 20 of the chassis 16 and provides, in part, propulsion of the snowmobile 10. In the illustrated implementation, the motor 26 is an internal combustion engine 26, but it is contemplated that it could be, for example, an electric motor or a hybrid. A fuel tank 28, supported above the tunnel 18, supplies fuel to the engine 26 for its operation.

An endless drive track 30 is positioned generally under the tunnel 18, and is operatively connected to the engine 26 via a drivetrain including a belt transmission system (not shown). The endless drive track 30 is driven to run about a rear suspension assembly 32 connected to the chassis 16 for propulsion of the snowmobile 10. The endless drive track 30 has a plurality of lugs 31 extending from an outer surface thereof to provide traction to the track 30.

The rear suspension assembly 32 includes a pair of drive sprockets 34 mounted on a drive axle 35, multiple idler wheels 36 and a pair of slide rails 38 in sliding contact with the endless drive track 30. Each slide rail 38 includes a front portion 37 and rear portion 39. The drive axle 35 having the drive sprockets 34 mounted thereon defines a drive axle axis 34a. The slide rails 38 are attached to the tunnel 18 by a front suspension arm 40 and a rear suspension arm 50. A front shock absorber assembly 42, including a coil spring 43 surrounding an individual shock absorber 44 and a rear shock absorber 45 with adjacent torsion springs 41 bias the slide rails 38 away from the tunnel 18. It is contemplated that the snowmobile 10 could be provided with a different implementation of a rear suspension assembly 32 than the one shown herein. The rear suspension assembly 32 will be discussed in more detail below.

A straddle seat 60 is positioned atop the fuel tank 28. The seat 60 is adapted to accommodate the user of the snowmobile 10. The seat 60 can also be configured to accommodate a passenger. A fuel tank fill opening covered by a cap 92 is disposed on the upper surface of the fuel tank 28 in front of the seat 60. It is contemplated that the fuel tank fill opening 92 could be disposed elsewhere on the fuel tank 28. A footrest 64 is positioned on each side of the snowmobile 10 below the seat 60 to accommodate the user's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, body panels 66 enclose the engine 26, the continuous variable transmission system 23 and other components of the powerpack such as the air intake system. The body panels 66 include a hood 68 which can be opened to allow access to the engine 26 and other internal components of the snowmobile 10 from the top and the front which may be required, for example, for inspection or maintenance of the engine 26 and/or the powerpack. The body panels 66 also include two side panels 98 extending along the left and right sides of the snowmobile 10. The engine 26 and the transmission system 23 are disposed between the side panels 98. The side panels 98 are both removably connected to the chassis 16 and/or to other body panels 66 and can be removed to access the internal components from the corresponding lateral side. A windshield 69 connected to the body panels 66 acts as a wind screen to lessen the force of the air on the user while the snowmobile 10 is moving.

Two skis 70 positioned at the forward end 12 of the snowmobile 10 are attached to the front suspension module 22 of the chassis 16 through a front suspension assembly 72. The front suspension module 22 is connected to the front end of the engine module 20. The front suspension assembly 72 includes ski legs 74, shock absorbers 75, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the chassis 16, including by two frame members 55 extending from the steering column 82 to the tunnel 18. The lower end of the steering column 82 is connected to the ski legs 74 via a steering rod 73. The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A left handle 85 and a right handle 85 are disposed on left and right sides of the handlebar 84 respectively. A throttle operator 77 in the form of a thumb-actuated throttle lever is mounted to the right side of the handlebar 84. Other types of throttle operators, such as a finger-actuated throttle lever, are also contemplated. A brake actuator 79, in the form of a hand brake lever 79, is provided on the left side 83 of the handlebar 84 for braking the snowmobile 10 in a known manner A right end of the brake lever 79 connects to a brake fluid reservoir 179 connected to the handlebar 84 rightward of the handle 85 (see FIG. 2). It is contemplated that the windshield 69 could be connected directly to the handlebar 84.

At the rear end 14 of the snowmobile 10, a snow flap 94 extends downward from the rear end of the tunnel 18. The snow flap 94 protects against snow and/or debris that can be projected rearward from the drive track 30 when the snowmobile 10 is being driven. The snow flap 94 also projects snow onto a heat exchanger that is used to cool liquid for cooling the engine 26.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 3:
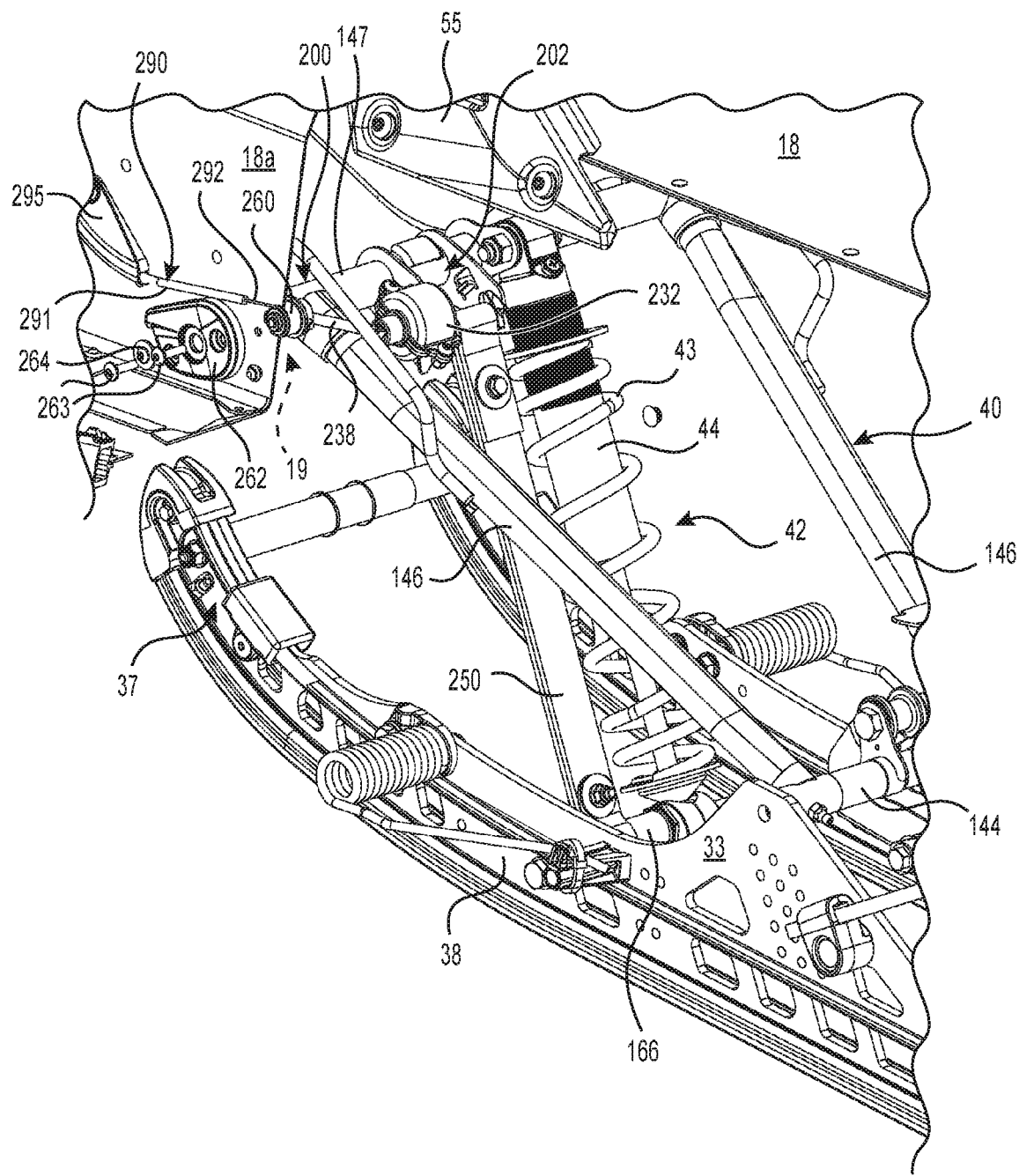
FIG. 3 is a close-up, rear, left side perspective view of the rear suspension assembly of FIG. 2, with a portion of the chassis removed.
Figure 4:
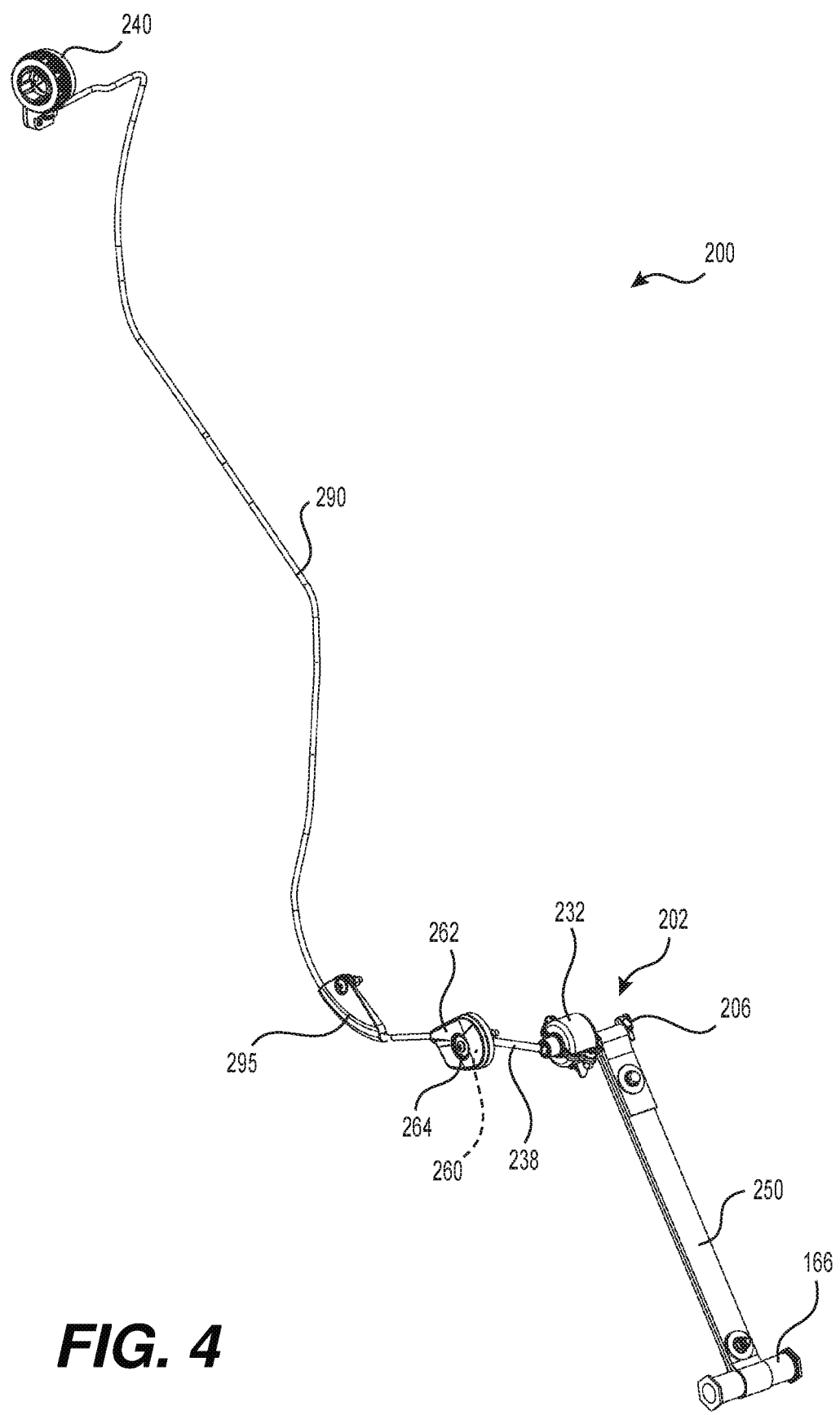
FIG. 4 is a rear, left perspective view of a limiter strap adjustment assembly of the snowmobile of FIG. 1, shown in isolation.
Figure 5:
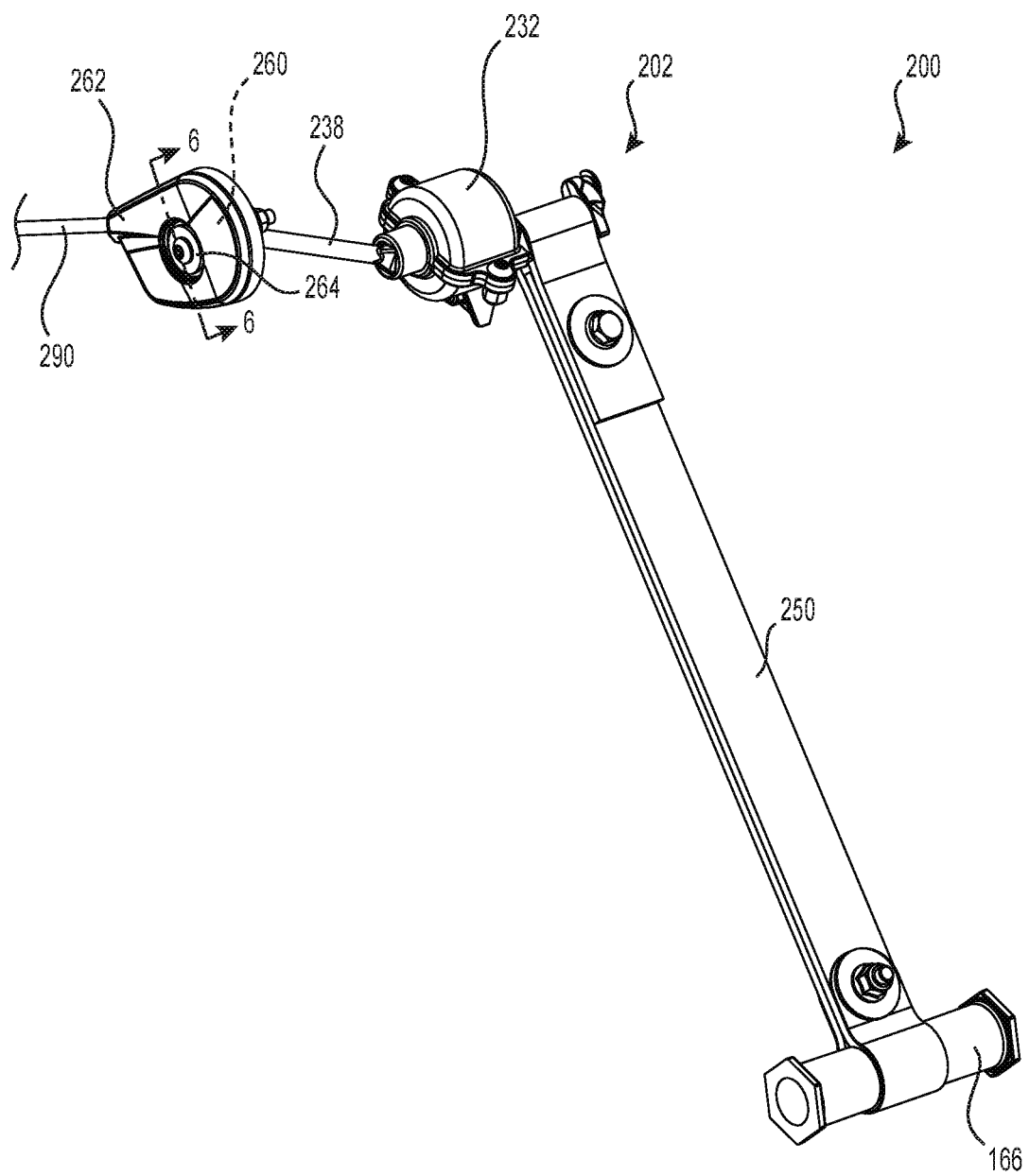
FIG. 5 is a close-up, rear, left perspective view of portions of the limiter strap adjustment assembly of FIG. 4.

With reference to FIGS. 2 and 3, portions of the rear suspension assembly 32 will now be discussed in more detail. As mentioned above, the rear suspension assembly 32 includes a pair of slide rails 38. The slide rails 38 are connected to pairs of rear idler wheels 36 engaging the endless track 30, at the front 37 and rear 39 portions of the slide rails 38.

The rear suspension assembly 32 includes the front suspension arm 40 and the rear suspension arm 50 disposed rearward of the front suspension arm 40. The front 40 and rear 50 suspension arms extend forwardly and upwardly from the slide rails 38. The tunnel 18 is supported by the front and rear suspension arms 40, 50. The pivoting of the suspension arms 40, 50 changes the relative angle and vertical separation between the slide rails 38 and the tunnel 18 to enable a transfer of weight to the front end 12 or the rear end 14 of the snowmobile 10 as would be appropriate for the travel speed and terrain, for example, during travel on inclined surfaces. The pivoting of the suspension arms 40, 50 also aids in bump absorption as the snowmobile 10 travels over uneven or rough terrain.

As best seen in FIG. 3, the front suspension arm 40 comprises an upper bar 147 and a lower bar 144 extending horizontally, and two laterally spaced bars 146 extending between the upper bar 147 and lower bar 144. The lateral bars 146 are welded to the upper and lower bars, 147 and 144, to form the front suspension arm 40. The upper bar 147 is a hollow metal tube rotatably attached to the tunnel 18 by means of a shaft (not shown) extending through the middle of the hollow tube 147 and bolted to the tunnel 18. The lower bar 144, also a hollow metal tube 144, is rotatably attached to the slide rails 38 by means of a shaft (not shown) extending through the middle of the hollow tube 144 and bolted to upward extensions 33 of the slide rails 38. It is contemplated that other suspension arm 40, 50 constructions and configurations could be implemented. The front shock absorber assembly 42, including the spring 43 and the shock absorber 44, extends between the upper bar 147 of the front suspension arm 40 and a cross-bar 166 (FIG. 3), extending between the slide rails 38.

With reference to FIGS. 2 to 6, the snowmobile 10 includes a limiter strap adjustment system 200 to adjust a maximum separation between a front portion 25 of the tunnel 18 and the front portion 37 of the slide rail 38. Specifically, the limiter strap adjustment system 200 includes a limiter strap 250 connected to the chassis 16, via the upper bar 147, and to the slide rails 38, via the cross-bar 166. The limiter strap 250 is substantially inextensible, such that a maximum allowed separation between the bars 147, 166 is limited by the configuration of the limiter strap 250. The limiter strap adjustment system 200 includes a strap adjustment actuator 240 connected, via a control cable 290, to an adjustable strap holder 202. As will be described in more detail below, a top loop of the limiter strap 250 is held by the strap holder 202, such that changing a vertical position of the strap holder 202 changes the maximum allowed separation between the bars 147, 166.

Figure 9:
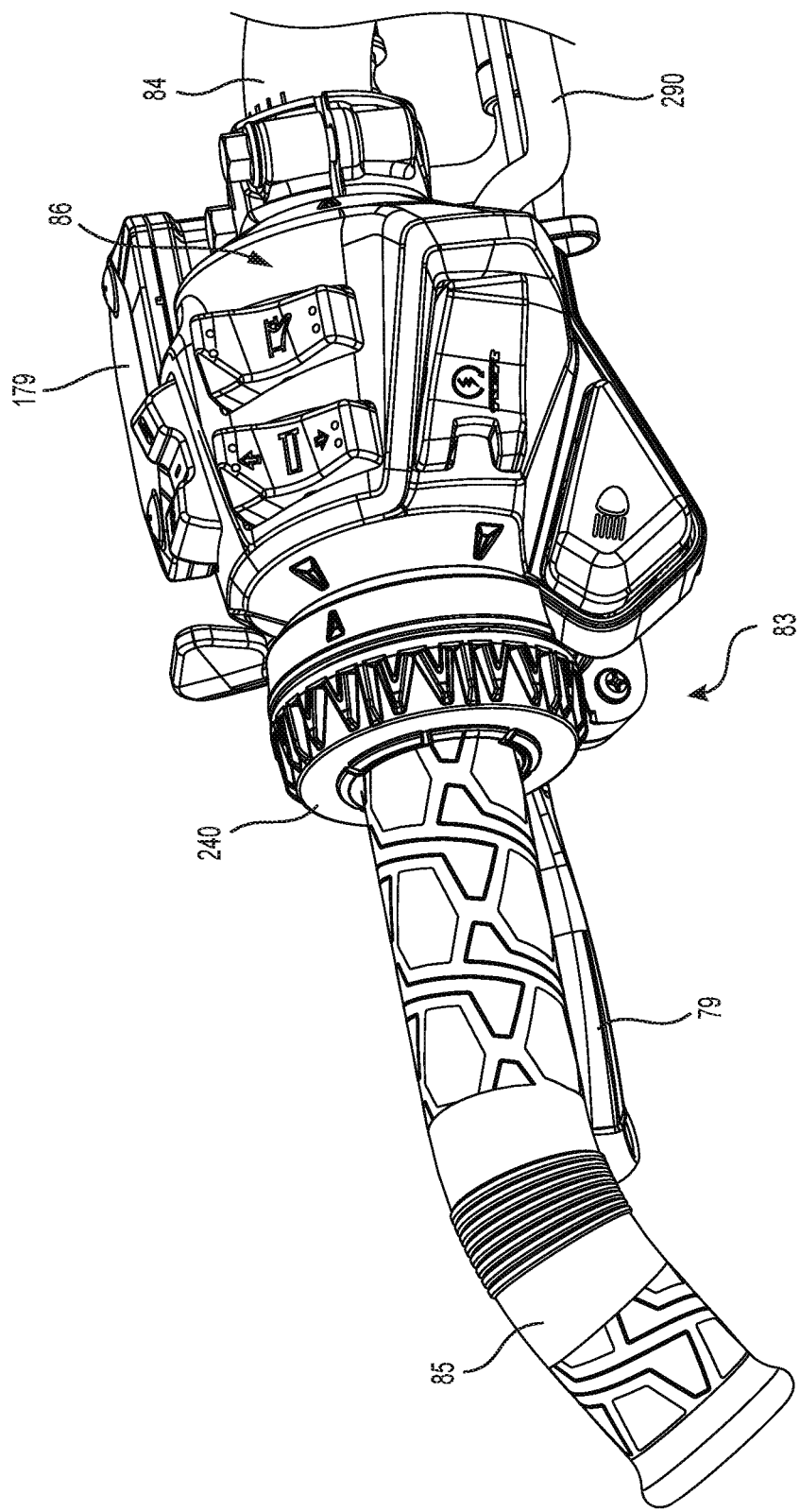
FIG. 9 is a close-up, rear perspective view of a left-side portion of a handlebar of the snowmobile of FIG. 1, showing a twist grip actuator of the limiter strap adjustment assembly of FIG. 4 in a top position.
Figure 11:
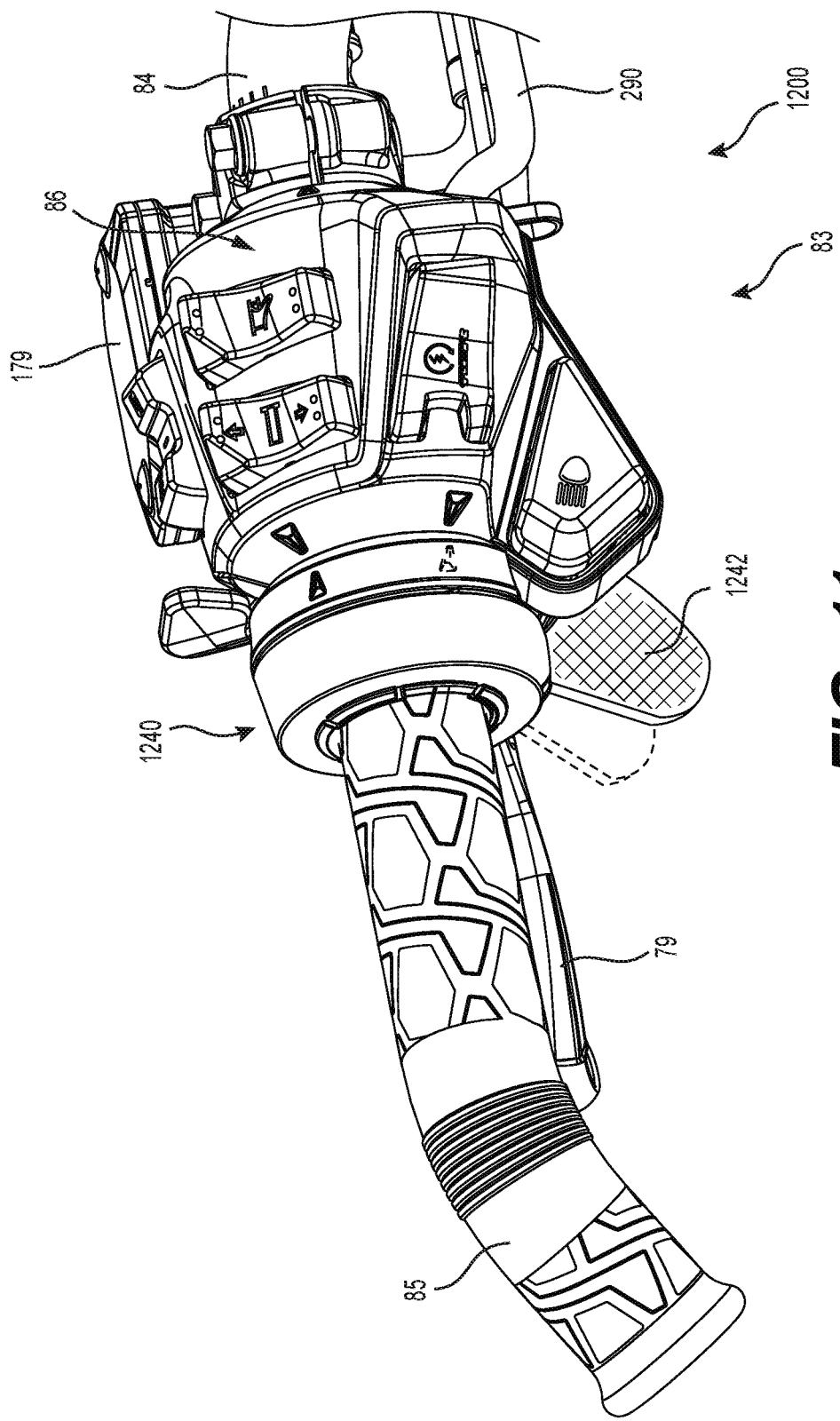
FIG. 11 is a close-up, rear perspective view of a left-side portion of a handlebar of a snowmobile according to another implementation of the present technology.
Figure 12:
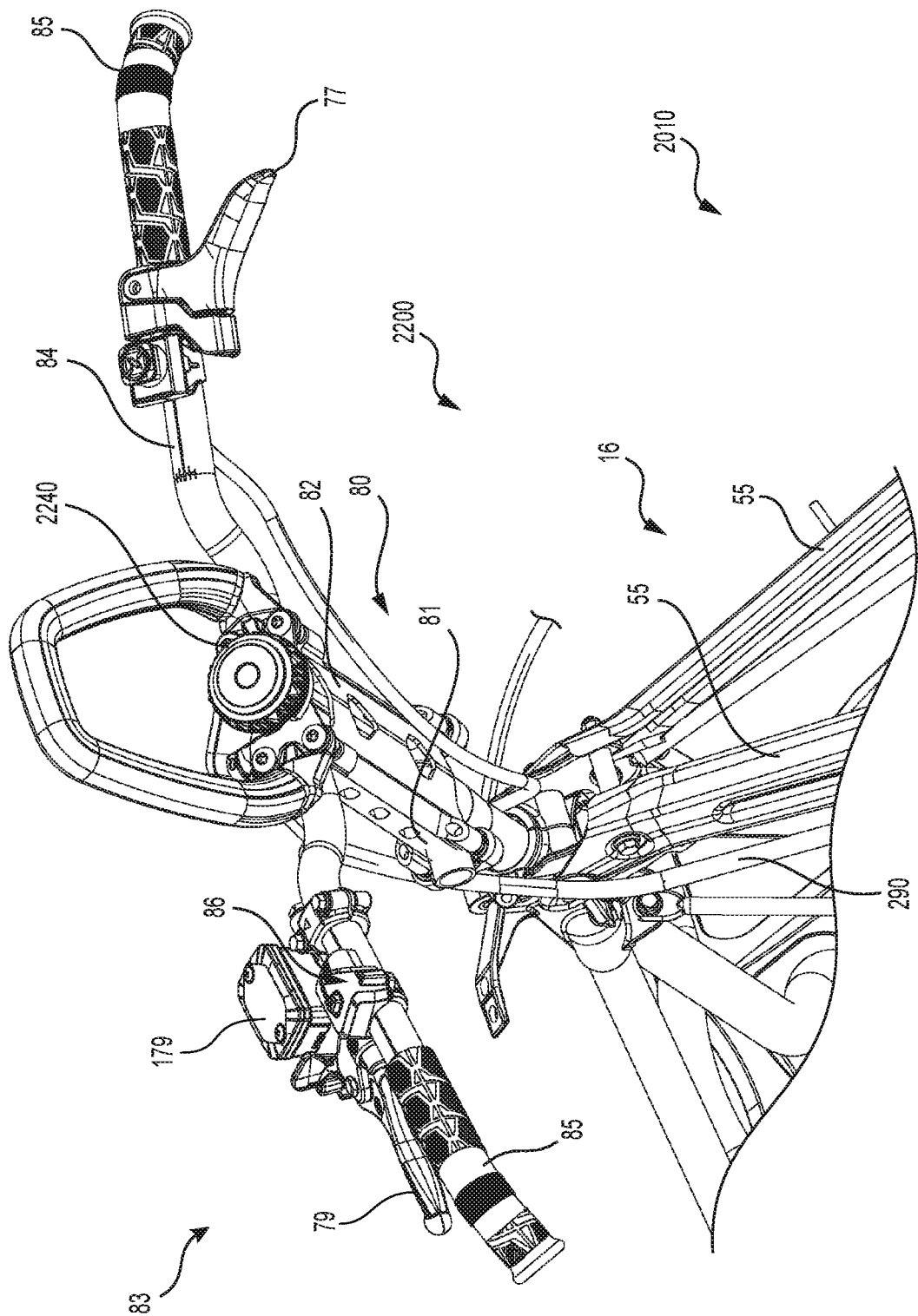
FIG. 12 is a close-up, rear, left side perspective view of a steering column and handlebar of a snowmobile according to yet another implementation of the present technology.
Figure 13:
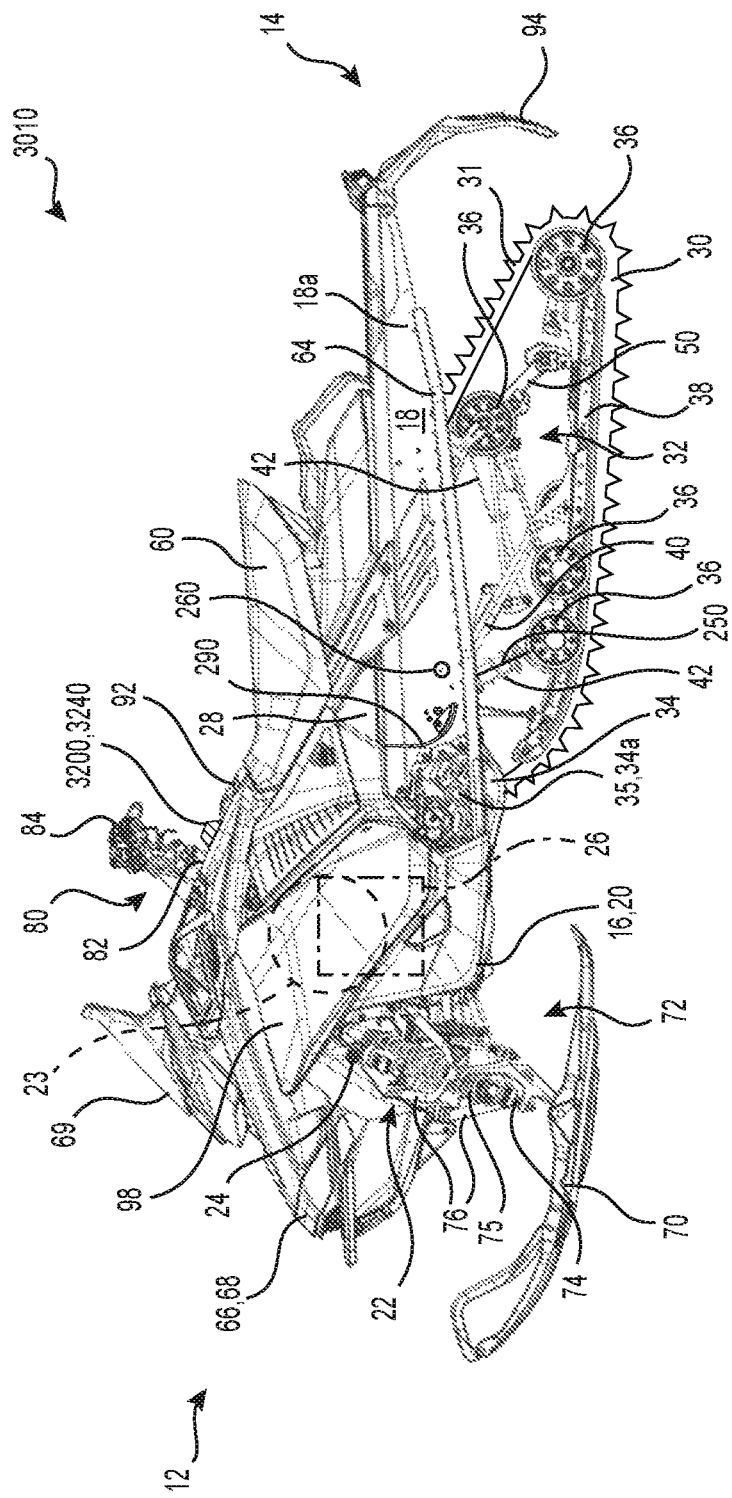
FIG. 13 is a left side elevation view of a snowmobile according to yet another implementation of the present technology.

In the present implementation, the strap adjustment actuator 240 is a twist grip actuator 240. The twist grip actuator 240, being disposed forward of the seat 60, is accessible to the user while operating the snowmobile 10. This allows the user to adjust the configuration of the limiter strap 250 without needing to stop and/or dismount the snowmobile 10. As can be seen in FIG. 9, the twist grip actuator 240 is disposed on a left side portion 83 of the handlebar 84. The twist grip actuator 240 is located between the left handle 85 and a left end of a switch housing 86. The switch housing 86 is disposed on the handlebar 84 between the left handle 85 and the brake fluid reservoir 179. The twist grip actuator 240 is located such that the user can turn the actuator 240 with their left hand, specifically within 5 cm of a right end of the left handle 85. It is contemplated that the twist grip actuator 240 could be located such that the user could turn the actuator 240 with their right hand, including having the actuator 240 disposed on a right side portion of the handlebar 84, between the right handle 85 and a left end portion of the throttle lever 77. The location of the twist grip actuator 240 is further not limited to the handlebar 84. FIGS. 12 and 13 illustrate implementations of different locations of actuators (still usable by the user during operation of the snowmobile 10), as will be described below. It is also contemplated that the strap adjustment actuator 240 could be one of several different actuator mechanisms, including but not limited to: a push-button, a twist knob on the handlebar 84, a switch, and a toggle switch. FIG. 11 illustrates an implementation using a lever actuator 1240 to adjust the limiter strap 250 and will be described below.

Figure 10:
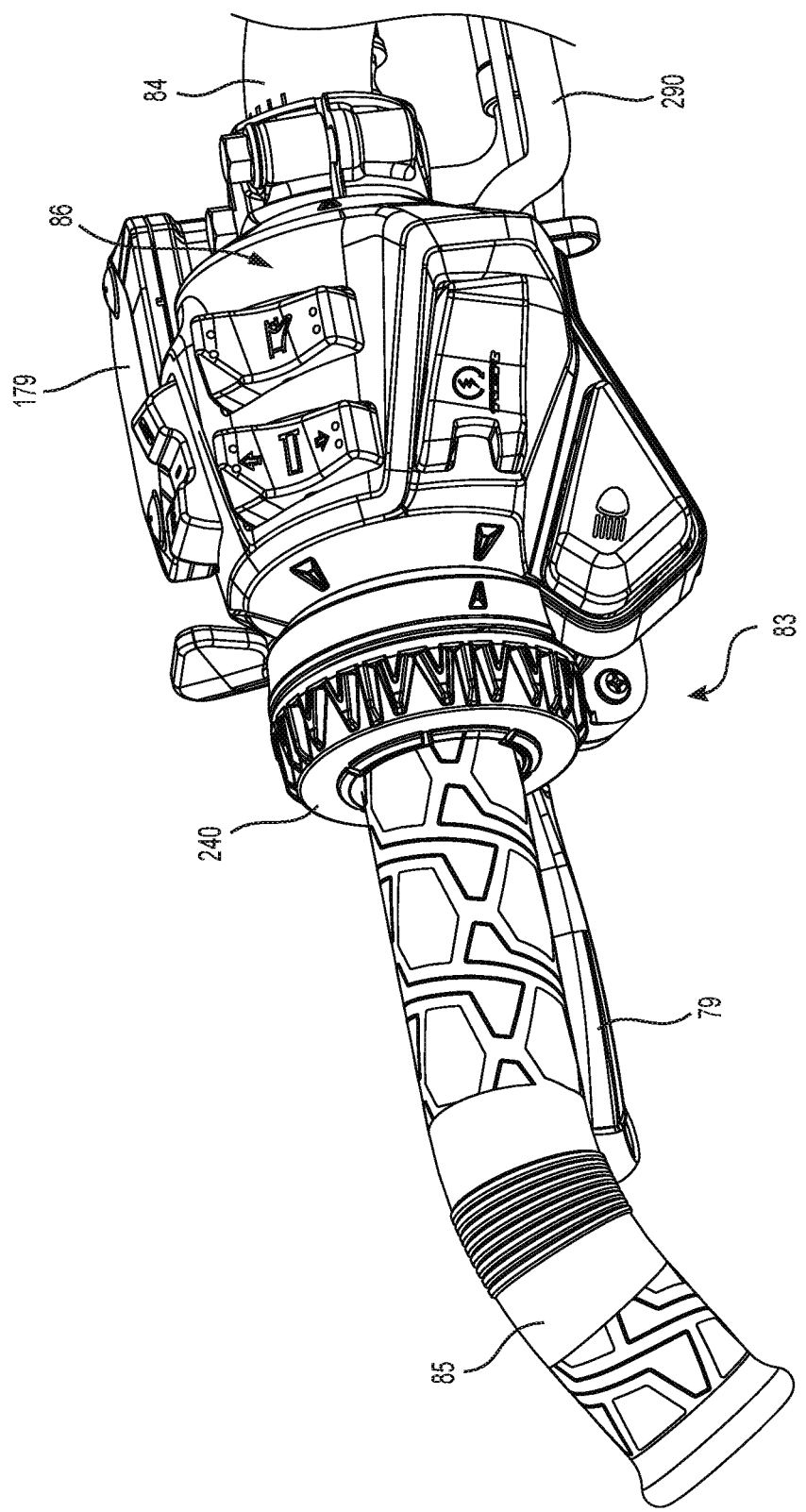
FIG. 10 is the close-up, rear view of FIG. 9, showing the twist grip in a bottom position.

The twist grip actuator 240 rotates between a top position (see FIG. 9) and a bottom position (FIG. 10). The top and bottom positions correspond to two different configurations of the limiter strap 250 (described below). It is contemplated that the twist grip actuator 240 could have more than two positions corresponding to other configurations of the limiter strap 250.

The twist grip actuator 240 connects to a front end of the control cable 290. As can be seen in FIG. 2, the control cable 290 runs from the actuator 240, along the handlebar 84, down the steering column 82 along a handlebar riser 81, along one of the frame members 55, and along an exterior side of a side wall 18a of the tunnel 18 to a rotating cylinder 260 (described below). As the control cable 290 runs along the frame member 55, the cable 290 is in an interior of the body panels 66 from the steering column 82 until it reaches the tunnel side wall 18a. This can be seen in FIG. 1, where the control cable 290 is hidden from view (inside the body panels 66) from the steering column 82 to the tunnel 18. It is contemplated that the control cable 290 could follow a different path along the chassis 16 and the tunnel 18, depending on the specific implementation.

The control cable 290 is a steel cable 292 within a plastic sleeve 291 (see FIG. 3). It is contemplated that the cable 292 could be made of a different materials, including but not limited to: wrought iron, para-aramid fiber, and carbon fiber.

It also contemplated that the sleeve 291 could be made of a different material, or be differently shaped, provided it protects the cable 292 while allowing the cable 292 to move within the sleeve 291. Different implementations of material of the sleeve 291 could include, but is not limited to, metal, ceramic, and resin. The control cable 290 is held to the exterior of the side wall 18a by a brace 295. It is contemplated that the control cable 290 could be fixed by more or less braces 295. It is also contemplated that the control cable 290 could be held in place on the snowmobile 10 by various other or additional means, including, but not limited to, fasteners, hooks, and cable loops.

Figure 6:
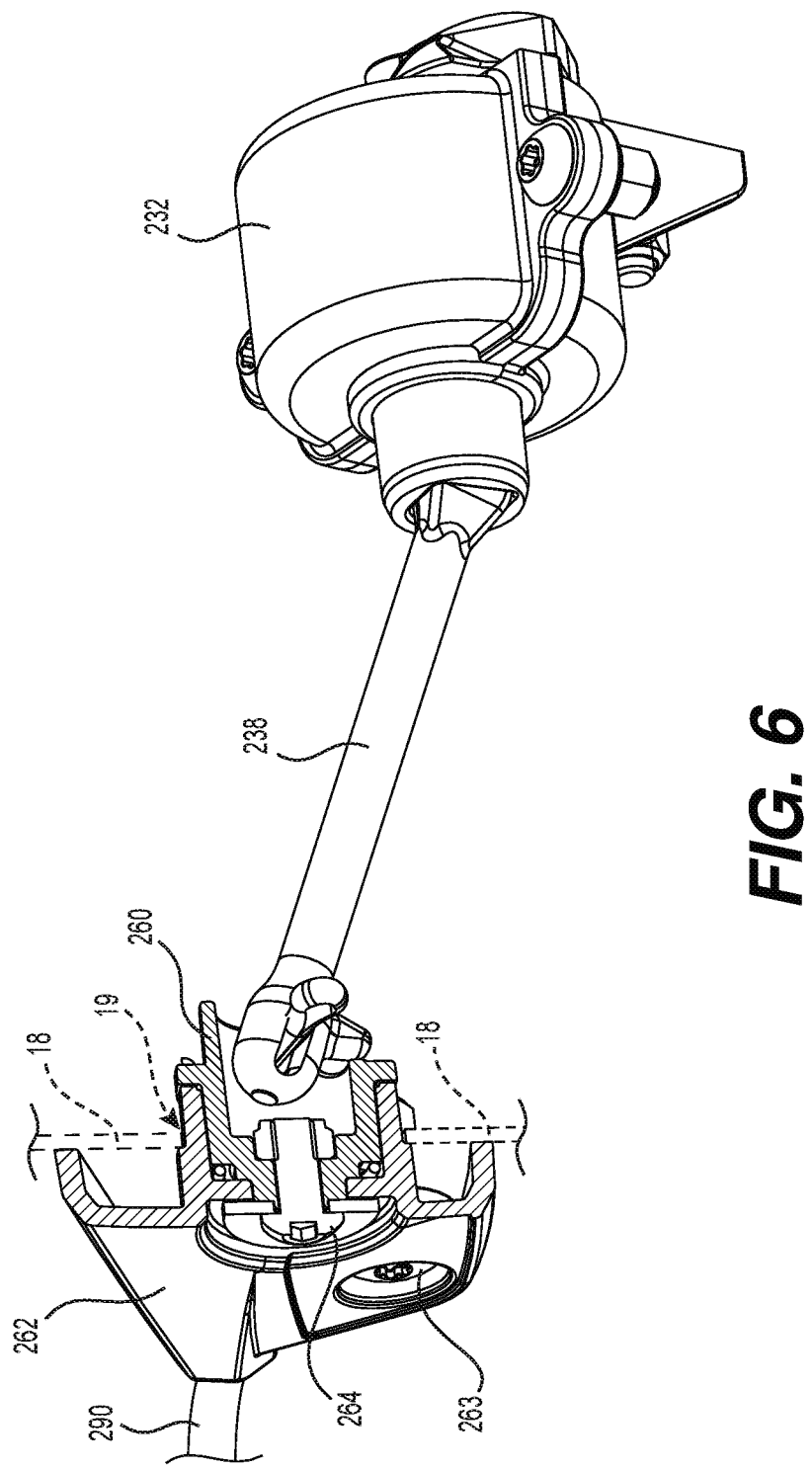
FIG. 6 is a close-up, rear, left perspective view of the portions of the limiter strap adjustment assembly of FIG. 5, with a partial cross-section along line 6-6 of FIG. 5.

The cable 292 connects at its rear end to an exterior side of the rotating cylinder 260 (see FIG. 3). The cylinder 260 is disposed in a hole in the side wall 18a of the tunnel 18. The exterior side of the cylinder 260 is covered by a cover 262 connected to the side wall 18a of the tunnel 18. The cover 262 is held in place by two bolts 263. As is illustrated in FIG. 6, an inside surface of the cover 262 includes a cylindrical portion passing through a hole 19 in the tunnel 18 and receives the cylinder 260 therein. Cylinder 260 is rotatably fixed to the cover 262 via a fastener 264. It is contemplated that the cover 262 could be held in place by more or less bolts 263, or with different fasteners. It is also contemplated that different implementations may not include the cover 262.

Figure 7B:
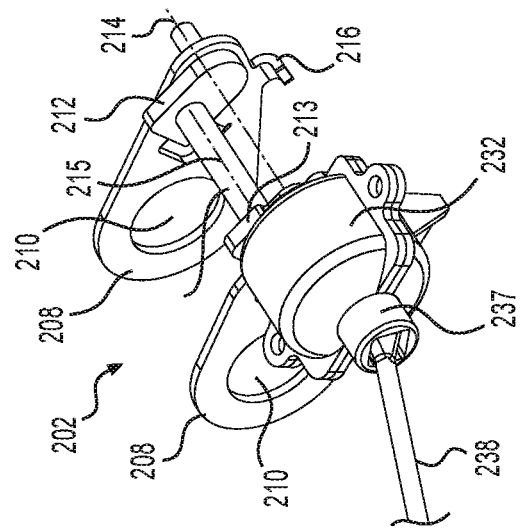
FIG. 7B is the close-up, rear, left side perspective view of the portion of the limiter strap adjustment assembly of FIG. 7A, with the strap holder disposed in a lowered position.
Figure 7A:
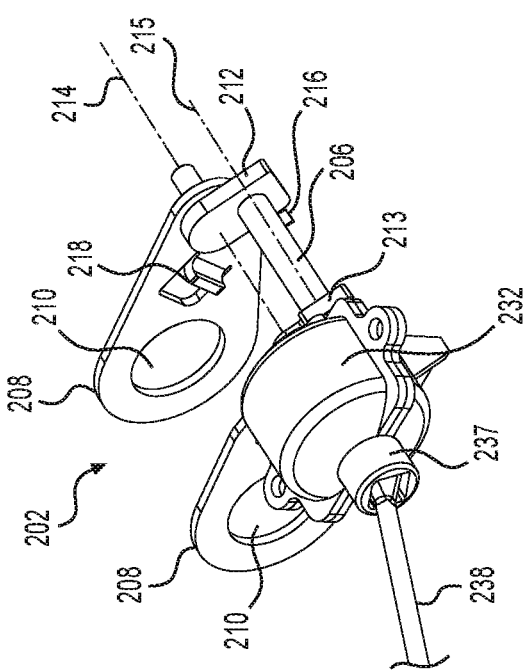
FIG. 7A is a close-up, rear, left side perspective view of a portion of the limiter strap adjustment assembly of FIG. 4, with a strap holder disposed in a raised position.
Figure 8:
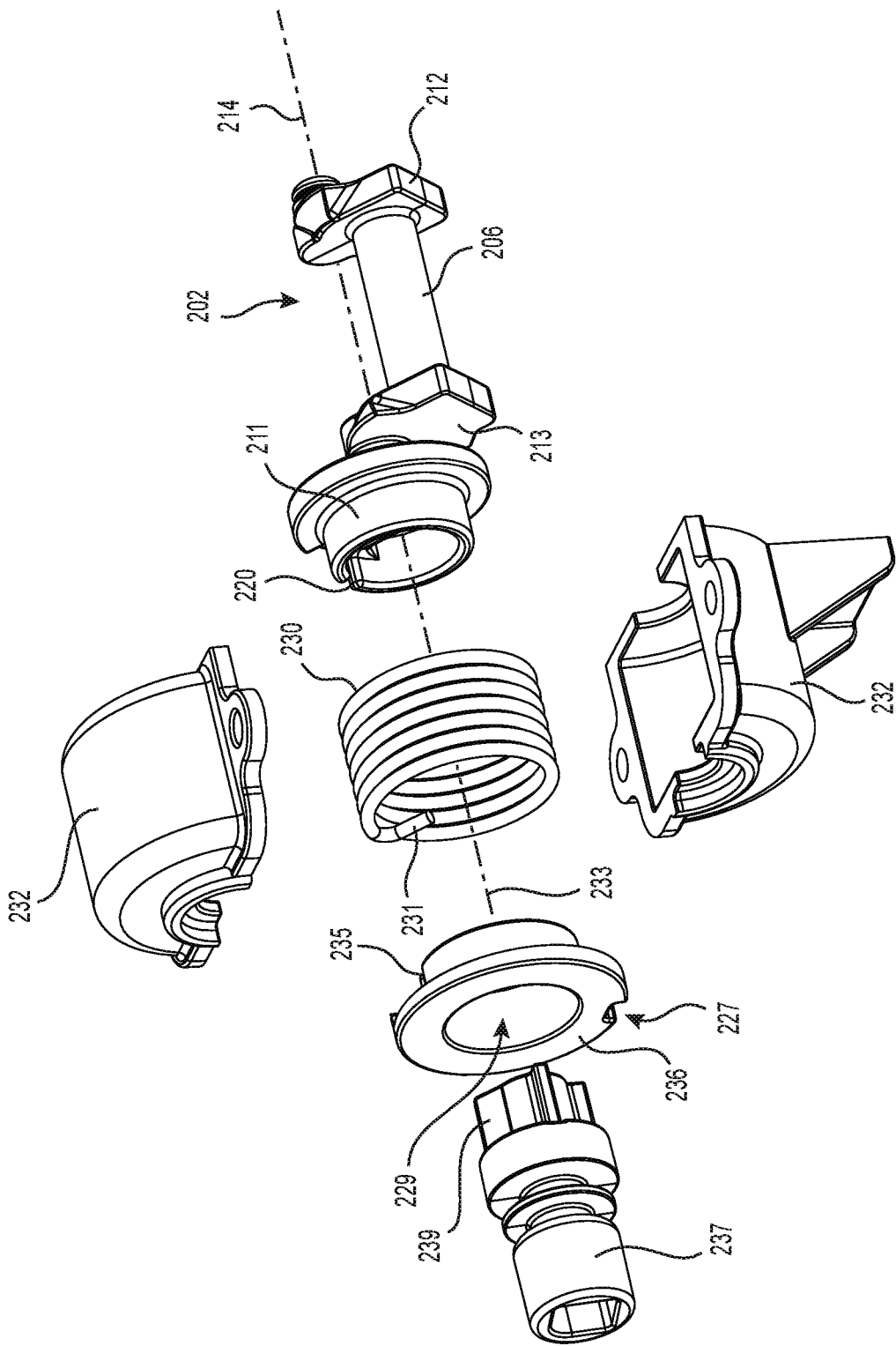
FIG. 8 is an exploded, rear, left side perspective view of the portion of the limiter strap adjustment assembly of FIG. 7A, with plates of the limiter strap adjustment assembly removed.

Turning now to FIGS. 7A, 7B, and 8, components of the limiter strap adjustment system 200 disposed inside the tunnel 18 will now be described, these components being connected to the control cable 290 (and thus the twist grip actuator 240) via the rotating cylinder 260. As can be seen in FIG. 3, the rotating cylinder 260 extends through the tunnel side wall 18a. On its exterior side, the rotating cylinder 260 connects to the control cable 290, as mentioned above. On its interior side, which is disposed within the tunnel 18, the rotating cylinder connects to a left end of a lever 238.

A right end of the lever 238 is coupled to strap holder 202 for moving the top loop of the limiter strap 250, in order to change its configuration, as will be described below. Specifically, a right end of the lever 238 connects to a left end of a rigid member 237. It is also contemplated the left end of the rigid member 237 could be connected directly to the rotating cylinder 260. The rigid member 237 extends through a housing 232. The housing 232 includes two semi-cylindrical portions that are bolted together. A right end 239 of the rigid member 237 is received in and connects to a left side portion 211 of a flange 213 of the strap holder 202.

Within the housing 232 (see FIG. 8), there is further disposed a biasing member 230. In the present implementation, the biasing member 230 is a torsion spring 230 that rotates about a torsion axis 233. It is contemplated that the biasing member 230 could be implemented as a different mechanism, including, but not limited to, a biased hinge and a cantilever spring. It is also contemplated that the biasing member 230 could be disposed in the rotating cylinder 260 in some implementations. The biasing member 230 is included in the limiter strap adjustment system 200 for adjusting a position of the strap holder 202, in cooperation with the rigid member 237, described below. A support member 236 is included within the housing 232 to hold a left end 231 of the torsion spring 230. The support member 236 is held rigidly in the housing 232 by a first notch 227 that receives a protrusion (not shown) on an interior of the housing 232. The support member 236 defines a passage 229 through which the rigid member 237 passes and is allowed to rotate without impedance from the support member 236. The support member 236 further defines a second notch 235 which receives the left end 231 of the torsion spring 230. It is contemplated that left end 231 of torsion spring 230 could be held in place by the housing 232.

The strap holder 202 comprises a strap bar 206 holding the top loop of the limiter strap 250, and a pair of plates 208, rigidly attached to the upper bar 147, to connect the limiter strap 250 to the upper bar 147. The plates 208 have been removed from the exploded view of the components of FIG. 8. The plates 208 are disposed parallel to one another and welded to the upper bar 147 of the front suspension arm 40 which is received through openings 210 in the plates 208. The strap bar 206 has a pair of flanges 212, 213 on opposite ends thereof which are rotatably connected to the plates 208 at locations spaced from the upper bar openings 210 to rotate about an axis 214. The axis 214 is parallel to the upper bar 147. The axis 215 of the strap bar 206 is parallel to and offset from the rotation axis 214 of the flanges 212, 213 such that the strap bar 206 and axis 215 pivot about the axis 214 when the flanges 212, 213 rotate about the axis 214. The left side portion 211 of the flange 213 also defines a notch 220 which receives a right end (not seen in FIG. 8) of the torsion spring 230. The torsion axis 233, about which torsion spring 230 rotates, coincides with the rotation axis 214 of the flanges 212, 213.

A pair of stops, 216 and 218, projecting from the inner surfaces of each plate 208 towards the other plate 208, serves to block the motion of the flanges 212, 213 about the axis 214 beyond the stops, 216 and 218. When the strap bar 206 abuts the stop 216, it is in a lowered position, and when it abuts the stop 218, it is in a raised position. The lowered and raised positions of the strap holder 202 correspond to the top and bottom positions of the twist grip actuator 240, respectively, as is described below.

As mentioned above, the limiter strap 250 is connected to the upper bar 147 and the cross-bar 166 for limiting their maximum separation. The strap holder 202 is connected between the limiter strap 250 and the front suspension arm 40. Specifically, the upper end of the limiter strap 250 is connected to the upper bar 147 by the strap holder 202 as described above. The limiter strap 250 is disposed adjacent to the shock absorber 42, which is also connected between the bars 147 and 166. The lower end of the limiter strap 250 is looped around the cross-bar 166, as can be seen in FIG. 3. The limiter strap 250 is substantially inextensible. In the present implementation, the limiter strap 250 is made of fabric reinforced rubber, although, it is contemplated that it could be made of any suitable material.

It is contemplated that the limiter strap 250 could be attached to other parts of the front suspension arm 40, the tunnel 8 or to the slide rails 38. It is also contemplated that the limiter strap 250 could be attached elsewhere along the tunnel 18 and the slide rails 38 to limit the separation between the front portion 25 of the tunnel 18 and the front portion 37 of the slide rail 38 to a maximum length. It is contemplated that the front suspension arm 40 could be configured differently than in the embodiment described above. It is also contemplated that the raised and lowered positions of the strap bar 206 could be set at different positions, and that there could be more than two positions that the strap bar 206 could be set at. Other configurations are also contemplated for the strap holder 202 including, for example, implementation of the strap bar 206 as a hook, a clamp or some other means of holding the limiter strap 250.

The limiter strap 250, the strap holder 202, and a snowmobile including both are described in more detail in U.S.

Pat. No. 9,022,156, published May 5, 2015, the entirety of which is incorporated herein by reference.

The cooperation of the components of the limiter strap adjustment system 200 to adjust the maximum separation between the front portion 25 of the tunnel 18 and the front portion 37 of the slide rail 38 will now be described in reference to FIGS. 3 to 9. As mentioned above, the limiter strap 250 limits the maximum allowed separation between the front portions 25, 37 based on the configuration of the limiter strap 250, which is related to the position of the strap holder 202.

The user of the snowmobile 10 controls the configuration of the strap holder 202 via the twist grip actuator 240. As can be seen in FIGS. 9 and 10, the twist grip actuator 240 is rotated between two positions: the top position (FIG. 9) and the bottom position (FIG. 10), which correspond to two different configurations of the limiter strap 250. When the actuator 240 is moved from one position to the other (in this example, from top to bottom position), the strap bar 206 will move to the corresponding position (from abutting 216 to abutting 218), however, not necessarily immediately, depending on the tension of limiter strap 250, as will be described below.

The top position of the twist grip actuator 240 (FIG. 9) corresponds to the lowered position of the strap bar 206 adjacent to the stop 216 (FIG. 7A). In this position of the strap holder 202, the axis 215 of the strap bar 206 is below the rotation axis 214 and the maximum allowed separation between the bars 147, 166 is greater than the length of the limiter strap 250 (the full length of the limiter strap 250 being below the rotation axis 214). The bottom position of the twist grip actuator 240 (FIG. 10) corresponds to the raised position of the strap bar 206 adjacent to the stop 218 (FIG. 7B). In this position of the strap holder 202, the axis 215 of the strap bar 206 is above the rotation axis 214 and a top portion of the limiter strap 250 is vertically above the rotation axis 214. In this case, the maximum allowed separation between the bars 147, 166 is less than it was when the strap bar 206 is in the lowered position, since only some of the limiter strap 250 extends below the rotation axis 214. As such, the lowered position of the strap holder 202 provides for a greater maximum allowed separation than the raised position of the strap holder 202 and the top position of the twist grip actuator 240 provides for the greater maximum allowed separation between the front portions 25, 37 than the bottom position of the twist grip actuator 240. It should be noted that the exact maximum allowed separation depends on the length of the limiter strap 250 and the angle at which it is disposed.

If the limiter strap 250 is slack, the twist grip actuator 240 can be turned from the top position to the bottom position. When the user rotates the twist grip actuator 240 from the top position to the bottom position (clockwise as seen from the left), the twist grip actuator 240 pulls the cable 292, causing an increase in tension. The increased tension on the cable 292 in turn rotates the rotating cylinder 260 and the lever 238 counter-clockwise. The rigid member 237, fixed to the lever 238, in turn rotates and turns the strap holder 202 counter-clockwise. The rotation of the strap holder 202 brings the strap bar 206 to the raised strap holder position adjacent to stop 218. Rotation of the flange 213 by the rigid member 237 also causes the right end of the torsion spring 230 to rotate counter-clockwise. As the left end 231 of the torsion spring 230 is fixed in the notch 235, rotation of the right end of the spring 230 compresses and loads the torsion spring 230.

In this raised position, the strap bar 206, and hence the top looped end of the limiter strap 250, is higher relative to the rotation axis 214 and the maximum allowed separation between the upper bar 147 and the cross bar 166 is shorter. In this raised position of the strap holder 202 and the bottom position of the twist grip actuator 240, the limiter strap 250 limits the maximum separation between the front portions 25, 37 to the shorter of the two maximum allowed separations, as mentioned above.

If the limiter strap 250 is not slack, and instead is taut between the cross-bar 166 and the strap bar 206, the strap holder 202 is prevented from moving upward and the user cannot turn the twist grip actuator 240 to move the strap holder 202 from the top to the bottom position. In order to turn the twist grip actuator 240 from the top to the bottom position, the user can cause slack in the limiter strap 250, such as by applying weight to the rear end of the snowmobile to compress the suspension which will momentarily slacken the limiter strap 250 while turning the actuator 240. The user may also wait for the limiter strap 250 to slacken during operation of the snowmobile 10. For example, when the snowmobile 10 encounters a bump and the front portion 37 of the slide rails 38 moves toward the tunnel 8, a momentary slack can be created in the limiter strap 250.

In order for the user to adjust the maximum separation from the shorter maximum allowed separation configuration (the raised position of the strap holder 202) to the longer maximum allowed separation configuration (the lowered position of the strap holder 202) between the front portions 25, 37, the user rotates the twist grip actuator 240 from its bottom position to its top position (counter-clockwise as seen from the left side of the snowmobile 10). In this case, the twist grip actuator 240 can be turned from the bottom position to the top position when the limiter strap 250 is slack. When the limiter strap 250 is slack, the strap holder 202 is not limited in its movement by the limiter strap 250, as is the case when moving from the lowered position to the raised position. When the limiter strap 250 is taut, however, tension from the limiter strap 250 prevents the strap holder 202 from rotating downward to the lowered position. As the strap bar 206 must rotate slightly upward over the rotation axis 214 before rotating downward to the lowered position, the tension from the limiter strap 250 prevents the strap holder 202 from moving until the tension is decreased as described above.

When the user turns the twist grip actuator 240 from the bottom position to the top position, the actuator 240 lets out the cable 292 to reduce its tension. The decreased tension on the cable 292, when the limiter strap 250 is slack, allows the torsion spring 230, having been compressed by rotation of the strap holder 202 from the lowered position to the raised position, to extend and turn the strap holder 202 back to the lowered position, where it is stopped by the stop 216. The rotation of the strap holder 202 also rotates back the rigid member 237, the lever 238, and the rotating cylinder 260, which can move because they are no longer being held by tension of the cable 292.

Another implementation of a limiter strap adjustment system 1200 including the strap adjustment actuator 1240 is illustrated in FIG. 11. The strap adjustment actuator 1240 is a lever actuator 1240 disposed on the left-side portion 83 of the handlebar 84, between the handle 85 and the brake fluid reservoir 179. The lever actuator 1240 rotates between a top actuator position (FIG. 11) and a bottom actuator position (in dashed lines in FIG. 11) when the user pushes a lever 1242 with one of their fingers. The user could equally pull the lever 1242 to alternate between the top and bottom actuator positions. As with the twist grip actuator 240, the lever actuator 1240 either increases or decreases tension on the control cable 290 in order to adjust the position of the strap holder 202. Remaining portions of the system 1200 are identical to the system 200 described above and as such need not be repeated here.

Another implementation of a limiter strap adjustment system 2200 including a strap adjustment actuator 2240 is illustrated in FIG. 12. In this implementation, the strap adjustment actuator 2240 is a dial knob 2240 disposed on a top of the handlebar riser 81 connecting the handlebar 84 to the chassis 16.

To alternate between the two different positions of the limiter strap 250 in this implementation, the user rotates the knob 2240 with either their left or right hand, the knob 2240 still being accessible to the user while operating the snowmobile 2010. Upon rotating the knob 2240, the knob 2240 increases or decreases the tension on the control cable 290, as described with respect to the strap limiter adjustment system 200. Remaining portions of the system 2200 are identical to the system 200 described above and as such need not be repeated here. Remaining portions of the snowmobile 2010 are identical to the snowmobile 10, other than replacement of the system 200 with the system 2200, and as such need not be repeated here.

Yet another implementation of a limiter strap adjustment system 3200 on a snowmobile 3010, including a strap adjustment actuator 3240, is illustrated in FIG. 13. In this implementation, the strap adjustment actuator 3240 is a dial knob 3240 disposed on one of the body panels 66, forward of the seat 60. The knob 3240 is connected to the control cable 290 in order to impart adjustments to the limiter strap 250 as described with respect to the knob 2240. Remaining portions of the system 3200 are identical to the system 200 described above and as such need not be repeated here. Remaining portions of the snowmobile 3010 are identical to the snowmobile 10, other than replacement of the system 200 with the system 3200, and as such need not be repeated here.

Figure 14B:
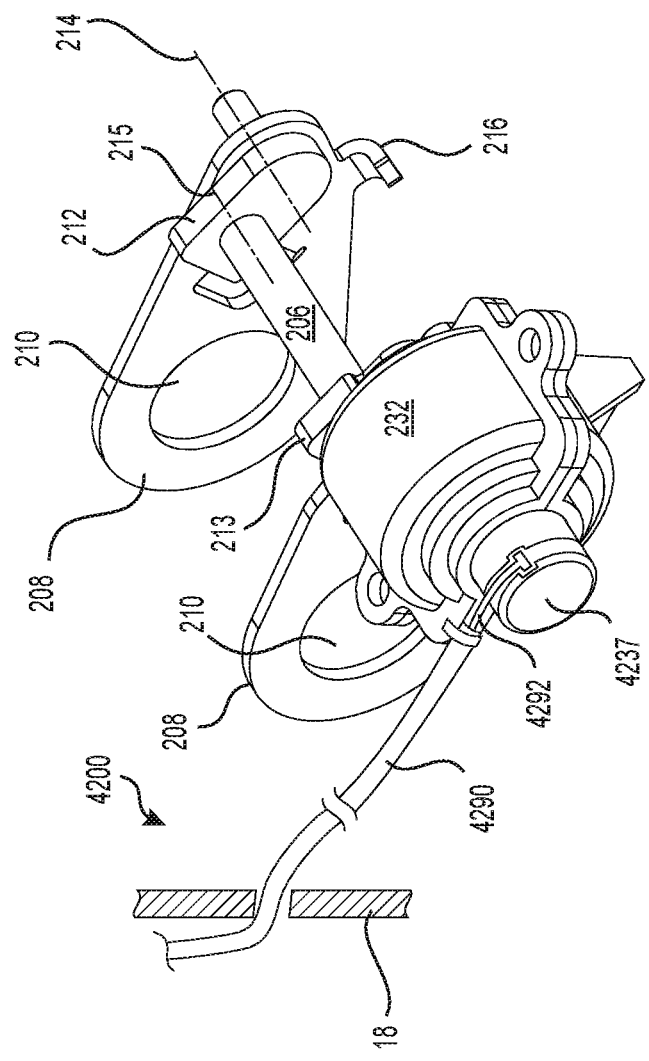
FIG. 14B is the close-up, rear, left side perspective view of the portion of the limiter strap adjustment assembly of FIG. 14A, with the strap holder disposed in a lowered position.
Figure 15:
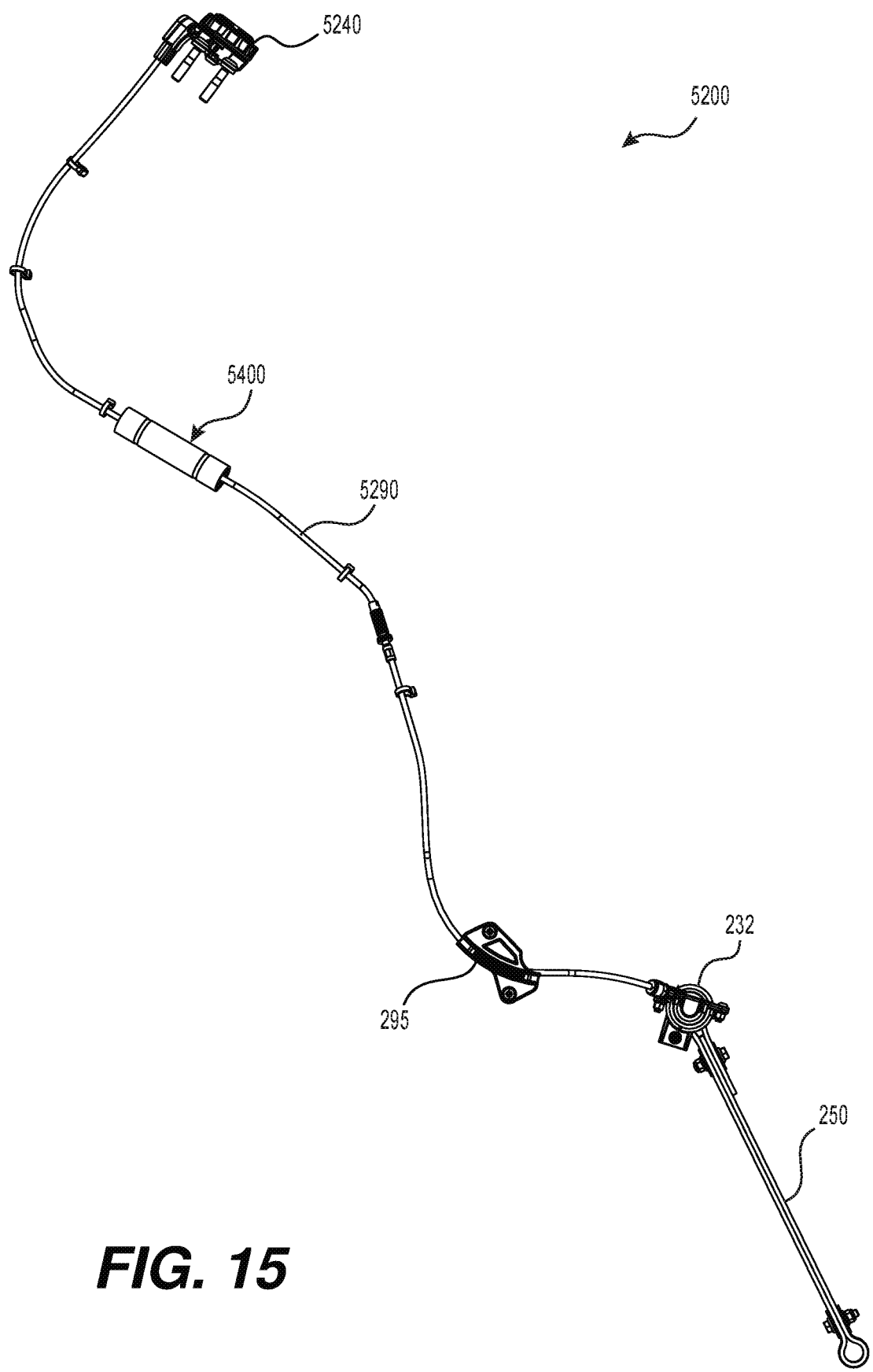
FIG. 15 is a left side elevation view of a limiter strap adjustment assembly according to another implementation of the present technology.

Yet another implementation of a limiter strap adjustment system 4200 is illustrated in FIGS. 14A and 14B. In this implementation, a control cable 4290 passes through the tunnel 18, without the cylinder 260 and the lever 238 of the system 200. A cable 4292 of the control cable 4290 is connected directly to a rigid member 4237 of the housing 232. In FIG. 7A, the strap bar 206 is in the lowered position, adjacent to the stop 216 and the cable 4292 has been let out (as described with respect to cable 292). In FIG. 7B, the strap bar 206 is in the raised position, adjacent to the stop 218. In this implementation, increased tension on the cable 4292 (as described above respect to cable 292) turns the rigid member 4237 counter-clockwise (as seen from the left). Remaining portions of the system 4200 are identical to the system 200 described above and as such need not be repeated here.

Yet another implementation of a limiter strap adjustment system 5200 is illustrated in FIGS. 15 to 19.

The limiter strap adjustment system 5200 includes a strap adjustment actuator 5240, which is a lever actuator 5240 disposed on the handlebar 84. The control cable 5290 of the adjustment system 5200, as with the control cable 290, includes the steel cable 292, as well as a sheath 5291 disposed therearound. In this implementation, the control cable 5290 further includes a control cable compensator assembly 5400, described in more detail below.

Figure 16:
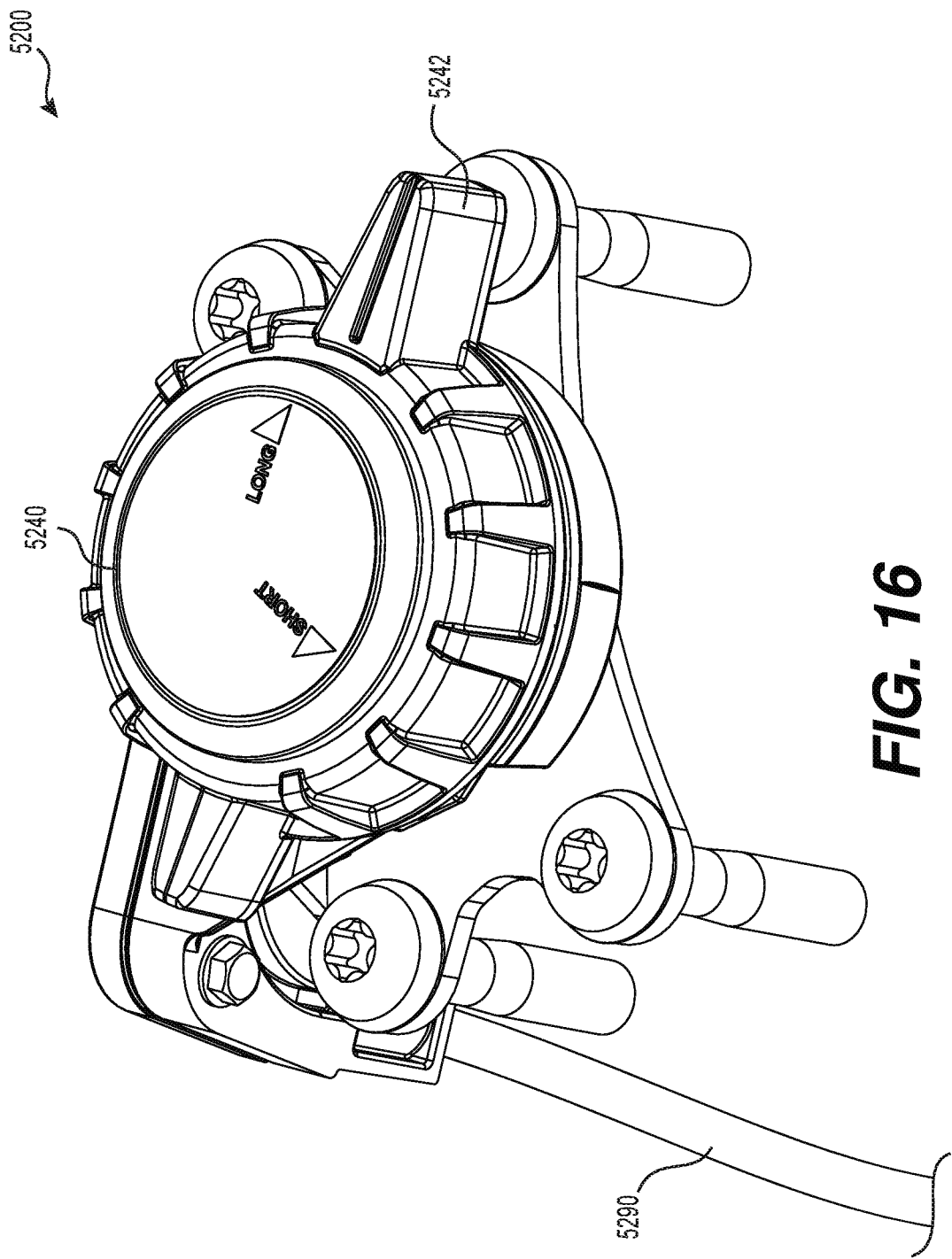
FIG. 16 is a close-up, rear, left side perspective view of a strap adjustment actuator of the limiter strap adjustment assembly of FIG. 15.

The lever actuator 5240 rotates between a "long" actuator position (as shown in FIG. 16), which corresponds to the strap holder 202 being in the lowered position, and a "short" actuator position (indicator line illustrated in FIG. 16) which corresponds to the strap holder 202 being in the raised position. As with the lever 1242, the user pushes a lever 5242 with using one or more of their fingers in order to change between the two positions. The user could equally pull the lever 5242 to alternate between the long and short actuator positions.

When the user rotates the lever actuator 5240, the position of the strap holder 202 changes, as described above. In some situations, however, it may not be possible for the strap holder 202 to change position. The compensator assembly 5400 is included on the control cable 5290 to aid in preventing any portion of the adjustment system 5200 from breaking if the lever actuator 5240 is rotated but the strap holder 202 cannot rotate.

Figure 17:
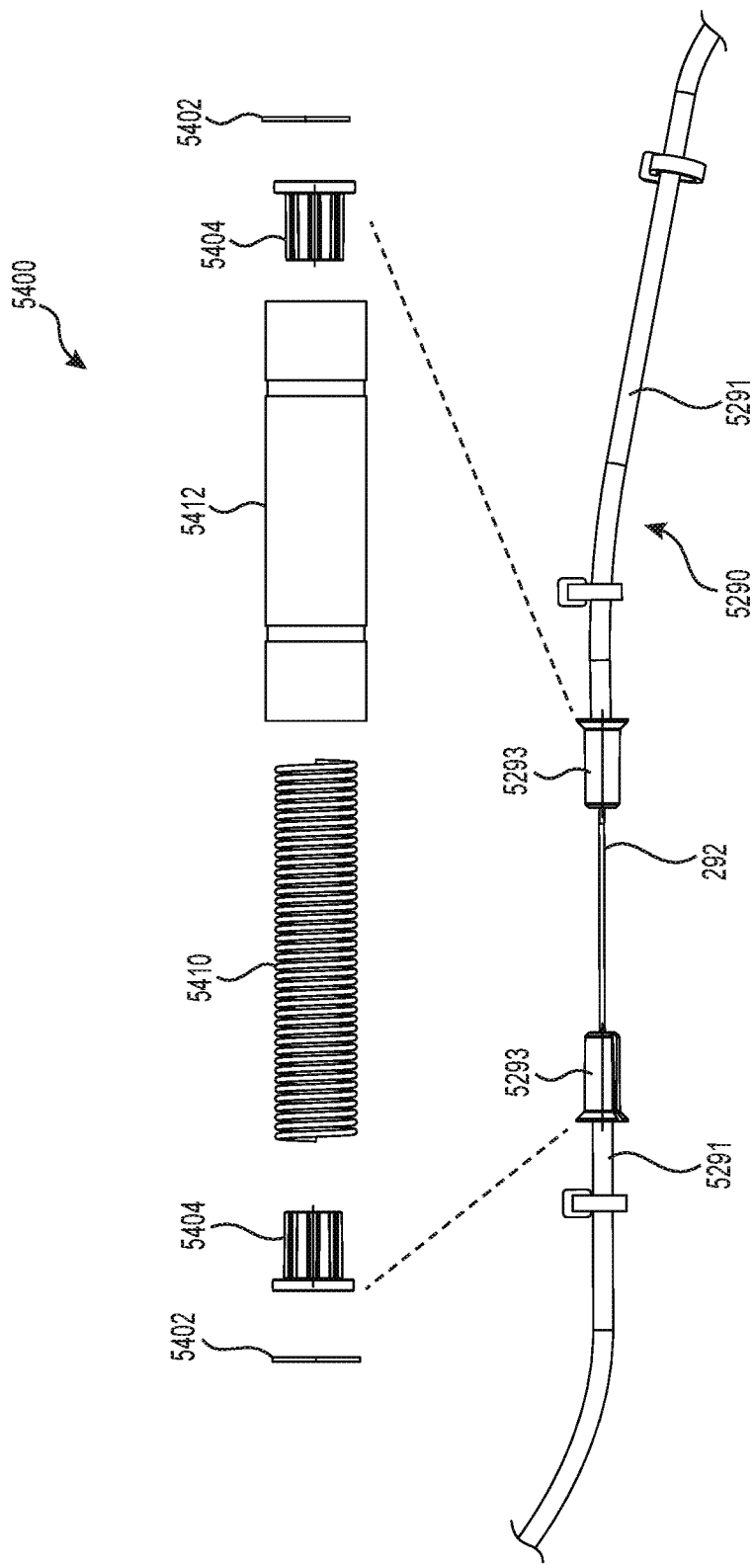
FIG. 17 is a close-up, exploded view of a control cable compensator of the limiter strap adjustment assembly of FIG. 15.

Components of the compensator assembly 5400 will now be described in more detail, with reference to FIG. 17. The compensator assembly 5400 is disposed around the steel cable 292 and is connected between a forward portion of the sheath 5291 and a rearward portion of the sheath 5291. Specifically, the compensator assembly 5400 connects between a forward cap 5293 extending from the forward portion of the sheath 5291 and a rearward cap 5293 extending from the rearward portion of the sheath 5291.

The compensator assembly 5400 includes two rigid members 5404, each of which are disposed on a corresponding one of the caps 5293. A resilient member 5410, specifically a spring 5410, is disposed around and extends between the two rigid members 5404. It is contemplated that the resilient member 5410 could be implemented differently. The steel cable 292 extends through the compensator assembly 5400, but is not connected thereto, such that the steel cable 292 may move freely with respect to the compensator assembly 5400.

When the lever actuator 5240 is rotated, but the strap holder 202 cannot rotate, the tension created in the steel cable 292 will bias the steel cable 292 and the sheath 5291 to straighten along their path between the actuator 5240 and the strap holder 202, which under normal circumstances, the rigid sheath 5291 prevents from happening. The forward cap 5293 and the rearward cap 5293 of the sheath 5291 will be pushed toward each other, compressing the spring 5410. This generally allows the steel cable 292 and the sheath 5291 to slightly straighten between the actuator 5240 and the strap holder 202 thus shortening the sheath length 5291, preventing any portion of the adjustment system 5200 from breaking. It should be noted that the spring 5410 is chosen to have a spring constant such that the spring 5410 will deform before tension can cause the steel cable 292 to break, while also being sufficiently rigid to resist compression at tensions necessary to compress the spring 230.

Finally, compensator assembly 5400 includes a cover 5412, to protect the resilient member 5410, for aesthetic purposes, and to generally impede the resilient member 5410 from bending rather than compressing. The cover 5412 is disposed around the resilient member 5410 and the rigid members 5404. Two retaining rings 5402 are disposed within grooves on the inner diameter of the cover 5412 to prevent the rigid members 5405 from exiting the cover 5412 under the bias of the spring 5410.

Figure 18:
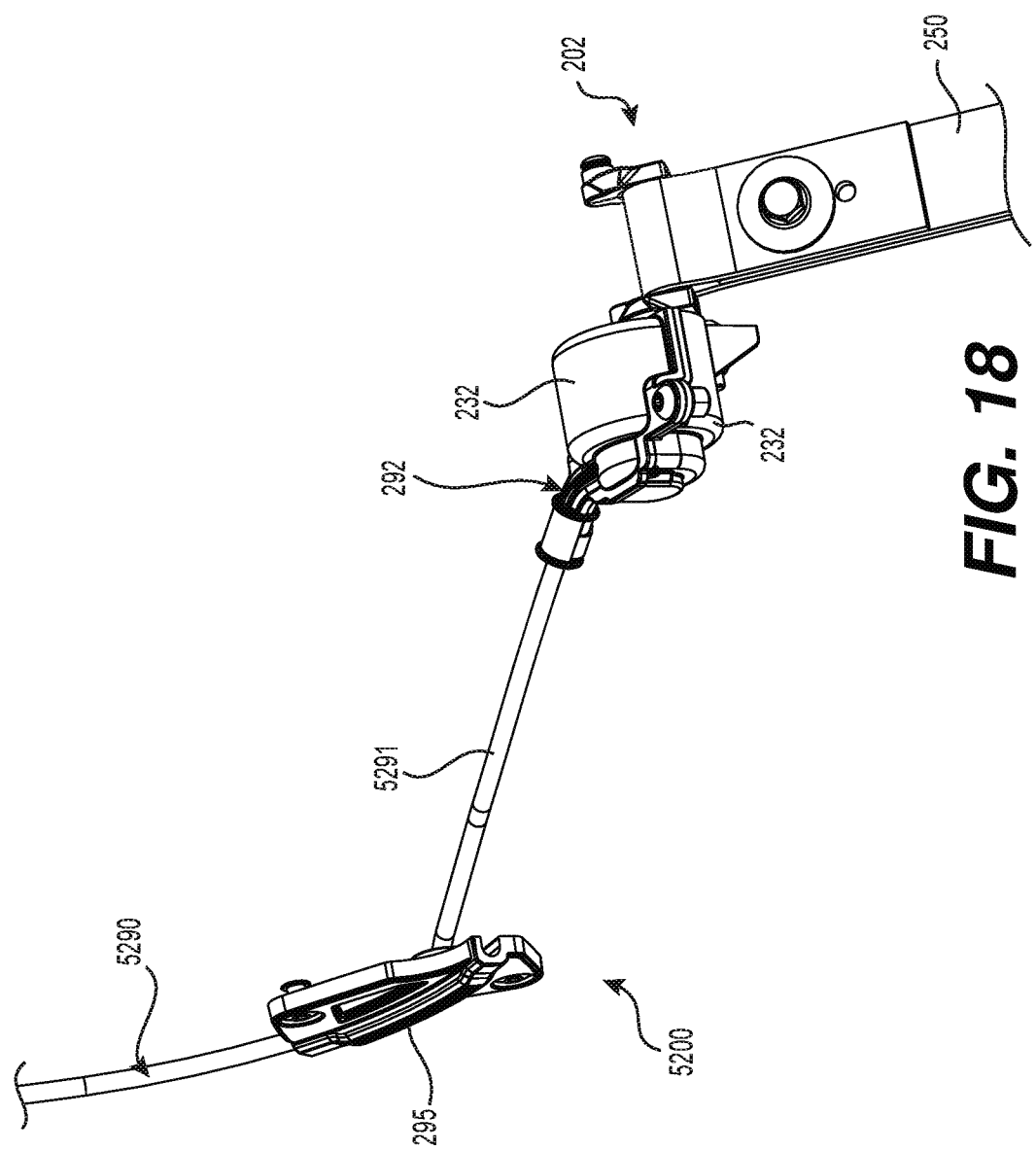
FIG. 18 is a close-up, rear, left perspective view of lower portions of the limiter strap adjustment assembly of FIG. 15.
Figure 19:
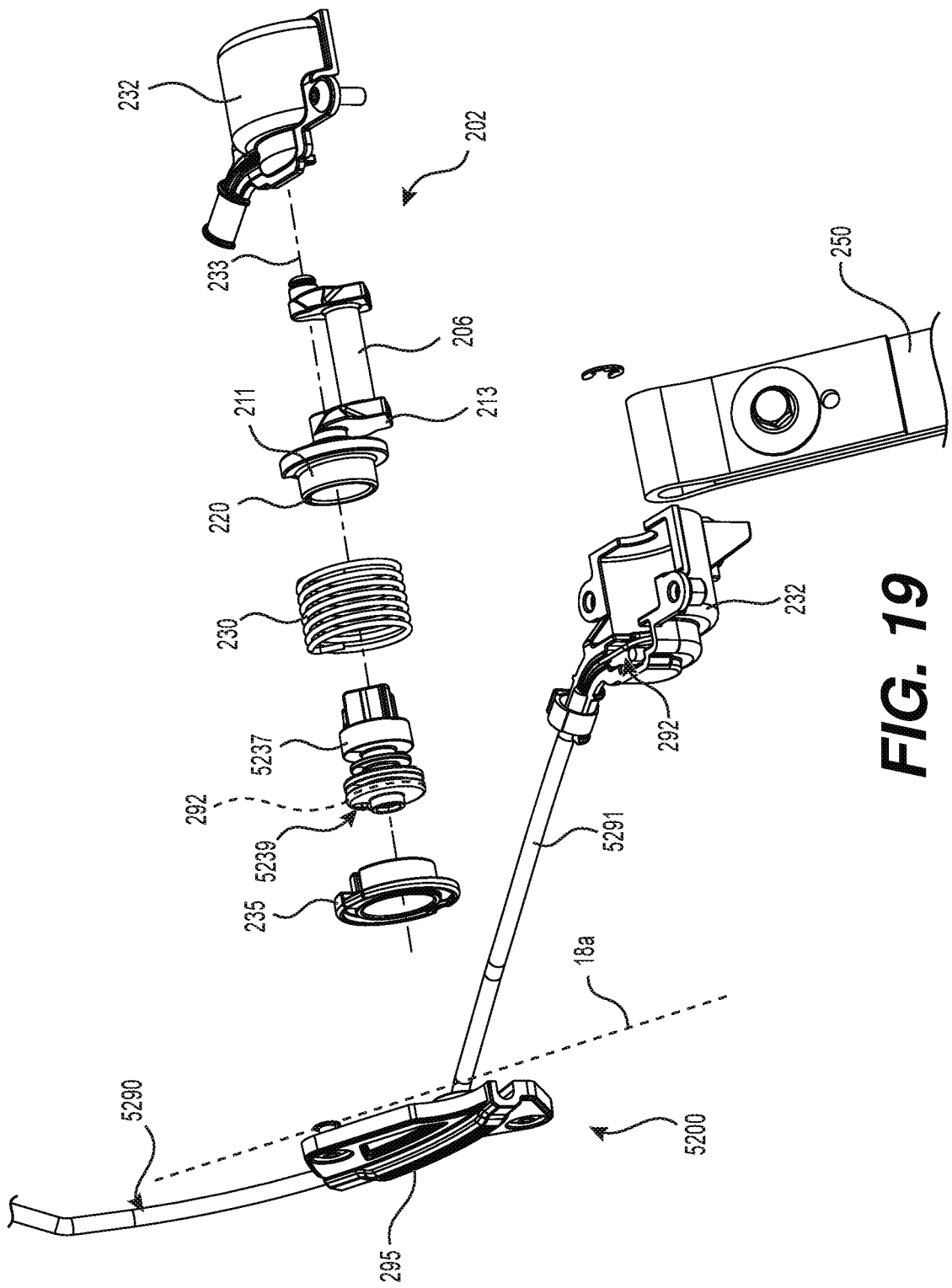
FIG. 19 is an exploded view of the lower portions of FIG. 18.

Turning now to FIGS. 18 and 19, components of the limiter strap adjustment system 5200 disposed inside the tunnel 18 will now be described, these components being connected to the steel cable 292, and thus the actuator 5240. The limiter strap adjustment system 5200, unlike the system 200 described above, does not include a rotating cylinder or a lever for connecting the steel cable 292 to the strap holder 202.

Instead, in the limiter strap adjustment system 5200, the control cable 5290 extends through an aperture (see FIG. 14A for example) in the side wall 18a of the tunnel 18. Within the tunnel 18, the rear end of the steel cable 292 to a rigid member 5237 disposed within the housing 232. As with the rigid member 237, the rigid member 5237 is rotatable about the axis 233 and connects to the strap holder 202. The rigid member 5237 connects, in contrast to member 237, directly to the rear end of the steel cable 292. As can be seen in FIG. 19, the rear end of the steel cable 292 is inserted through an aperture 5239 in the rigid member 5237 and is then secured thereto.

Remaining portions of the system 5200 are identical to the system 200 described above and as such need not be repeated here.

The vehicle 10, 2010, 3010 implemented in accordance with some non-limiting implementations of the present technology can be represented as presented in the following numbered clauses.

CLAUSE 1. A vehicle (10, 2010, 3010), comprising: a chassis (16); at least one seat (60) connected to the chassis (16); a motor (26) connected to the chassis (16); an endless drive track (30) disposed below the chassis (16), the endless drive track (30) being operatively connected to the motor (26) for propulsion of the vehicle (10, 2010, 3010); a rear suspension assembly (32) supporting the endless drive track (30), the rear suspension assembly (32) comprising: a left slide rail (38); a right slide rail (38); at least one suspension arm (40) pivotally connected to one of the left and right slide rails (38) and pivotally connected to the chassis (16); a shock absorber (42) connected between the chassis (16) and the one of the left and right slide rails (38); a limiter strap (250) extending between the chassis (16) and the one of the left and right slide rails (38), the limiter strap (250) being substantially inextensible to limit separation between the one of the left and right slide rails (38) and the chassis (16); a strap holder (202) connected between an end of the limiter strap (250) and one of: the one of the left and right slide rails (38), and the chassis (16), the strap holder (202) being moveable between a first holder position and a second holder position, a position of the end of the limiter strap (250) being different in the first strap holder position compared to the second strap holder position; a control cable (290, 4290, 5290) having a first end operatively connected to the strap holder (202) of the rear suspension assembly (32); and a strap adjustment actuator (240, 1240, 2240, 3240, 5240) operatively connected to a second end of the control cable (290, 4290, 5290), the strap adjustment actuator (240, 1240, 2240, 3240, 5240) being disposed forward of the at least one seat (60), the strap adjustment actuator (240, 1240, 2240, 3240, 5240) being operable by a user during operation of the vehicle (10, 2010, 3010), the strap adjustment actuator (240, 1240, 2240, 3240, 5240) being operatively connected to the strap holder (202) via the control cable (290, 4290, 5290), the strap adjustment actuator (240, 1240, 2240, 3240, 5240) being movable between a plurality of actuator positions, the plurality of actuator positions including at least a first actuator position and a second actuator position, a position of the strap holder (202) being related to a selected one of the plurality of actuator positions.

CLAUSE 2. The vehicle (10, 2010, 3010) of clause 1, wherein when the limiter strap (250) is taut: the strap holder (202) is prevented from moving from the first strap holder position to the second strap holder position; and the strap holder (202) is prevented from moving from the second strap holder position to the first strap holder position.

CLAUSE 3. The vehicle (10, 2010, 3010) of clause 1 or 2, further comprising a biasing member (230); and wherein: a first end of the biasing member (230) is operatively connected to the strap holder (202); moving the strap holder (202) toward the second strap holder position compresses the biasing member (230); and the biasing member (230) biases the strap holder (202) toward the first strap holder position.

CLAUSE 4. The vehicle (10, 2010, 3010) of clause 3, wherein: the biasing member (230) is a torsion spring (230) having a torsion axis (233); and a first end of the torsion spring (230) is connected to the strap holder (202).

CLAUSE 5. The vehicle (10, 2010, 3010) of any one of clauses 1 to 4, further comprising: a rotating cylinder (260) connected to the first end of the control cable (290, 4290, 5290) on a first side of the rotating cylinder (260); a lever (238) having a first end and a second end, the first end of the lever (238) being connected to a second side of the rotating cylinder (260); and a rigid member (237) having a first end and a second end, the first end of the rigid member (237) being connected to the second end of the lever (238), the second end of the rigid member (237) being connected to the strap holder (202).

CLAUSE 6. The vehicle (10, 2010, 3010) of clause 5, wherein: the chassis (16) includes a tunnel (18), the rear suspension assembly (32) being connected the tunnel (18); and the rotating cylinder (260) is received in an opening in a side wall of the tunnel (18), the rotating cylinder (260) extending at least partially into an interior of the tunnel (18).

CLAUSE 7. The vehicle (10, 2010, 3010) of any one of clauses 1 to 6, further comprising: a handlebar (84) connected to the chassis (16); and wherein: the strap adjustment actuator (240, 1240, 2240, 3240, 5240) is a twist grip actuator (240, 2240, 3240) disposed on the handlebar (84); and the twist grip actuator (240, 2240, 3240) is movable between at least the first actuator position and the second actuator position by twisting the twist grip actuator (240, 2240, 3240) about the handlebar (84).

CLAUSE 8. The vehicle (10, 2010, 3010) of clause 7, further comprising: a left handle (85) disposed on a left side portion (83) of the handlebar (84);
a brake lever (79) disposed on the left side portion (83), the brake lever (79) being connected to a brake fluid reservoir (179), the brake fluid reservoir (179) being connected to the handlebar (84) rightward of the left handle (85); a right handle (85) disposed on a right side portion of the handlebar (84); a throttle lever (77) disposed on the right side portion, a left end portion of the throttle lever (77) being connected to the handlebar (84) leftward of the right handle (85); and wherein the twist grip actuator (240, 2240, 3240) is disposed between one of: the left handle (85) and the brake fluid reservoir (179), and the right handle (85) and the left end portion of the throttle lever (77).

CLAUSE 9. The vehicle (10, 2010, 3010) of clause 7 or 8, further comprising: a handle (85) disposed on a side portion of the handlebar (84); and wherein the twist grip actuator (240, 2240, 3240) is disposed on the handlebar (84) laterally inward of the handle (85).

CLAUSE 10. The vehicle (10, 2010, 3010) of clause 9, wherein the twist grip actuator (240, 2240, 3240) is less than 5 cm from a laterally inward edge of the handle (85).

CLAUSE 11. The vehicle (10, 2010, 3010) of clause 7, further comprising: a handlebar riser (81) disposed between the handlebar (84) and the chassis (16); and at least one body panel (66) connected to the chassis (16); and wherein: the control cable (290, 4290, 5290) runs from the twist grip actuator (240, 2240, 3240), along the handlebar (84), along the handlebar riser (81), and in an interior of the at least one body panel (66) to the strap holder (202).

CLAUSE 12. The vehicle (10, 2010, 3010) of clause 1, further comprising: a handlebar (84) connected to the chassis (16); and wherein: the strap adjustment actuator (240, 1240, 2240, 3240, 5240) is a lever actuator (1240, 5240) disposed on the handlebar (84); and the lever actuator (1240, 5240) is movable between at least the first actuator position and the second actuator position by at least one of: pushing the lever actuator (1240, 5240), and pulling the lever actuator (1240, 5240).

CLAUSE 13. The vehicle (10, 2010, 3010) of any one of clauses 1 to 12, further comprising: at least one body panel (66) connected to and disposed above the chassis (16); and wherein the strap adjustment actuator (240, 1240, 2240, 3240, 5240) is connected to the at least one body panel (66).

CLAUSE 14. The vehicle (10, 2010, 3010) of any one of clauses 1 to 13, further comprising: a handlebar riser (81) connected to the chassis (16); and wherein the strap adjustment actuator (240, 1240, 2240, 3240, 5240) is disposed on the handlebar riser (81).

CLAUSE 15. The vehicle (10, 2010, 3010) of any one of clauses 1 to 14, further comprising: at least one body panel (66); and wherein a portion of the control cable (290, 4290, 5290) is disposed in an interior side of the at least one body panel (66).

CLAUSE 16. The vehicle (10, 2010, 3010) of any one of clauses 1 to 15, wherein the strap holder (202) is connected between the end of the limiter strap (250) and one of the at least one suspension arm (40).

CLAUSE 17. The vehicle (10, 2010, 3010) of any one of clauses 1 to 16, wherein: the vehicle (10, 2010, 3010) is a snowmobile (10, 2010, 3010); the chassis (16) includes a tunnel (18), the rear suspension assembly (32) being connected to the tunnel (18); and further comprising: a front right ski (70) connected to a front right portion of the chassis (16); and a front left ski (70) connected to a front left portion of the chassis (16).

CLAUSE 18. The vehicle (10, 2010, 3010) of claim 17, wherein: the control cable (290, 4290, 5290) is disposed on an exterior side of a tunnel wall (18a) of the tunnel (18); and the strap holder (202) is disposed in an interior of the tunnel (18).

CLAUSE 19. The vehicle (10, 2010, 3010) of claim 17, further comprising: at least one body panel (66); and wherein: the tunnel (18) includes at least one tunnel side wall (18a); and the control cable (290, 4290, 5290) runs from the strap adjustment actuator (240, 1240, 2240, 3240, 5240), into an interior of the at least one body panel (66) and along an exterior of the at least one tunnel side wall (18a).

CLAUSE 20. The vehicle (10, 2010, 3010) of any one of clauses 17 to 19, wherein: the at least one seat (60) includes a straddle seat (60) disposed on the chassis (16); and wherein the strap holder actuator (240, 1240, 2240, 3240, 5240) is disposed forward of the straddle seat (60).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle, comprising:
a chassis;
at least one seat connected to the chassis;
a motor connected to the chassis;
an endless drive track disposed below the chassis, the endless drive track being operatively connected to the motor for propulsion of the vehicle;
a rear suspension assembly supporting the endless drive track, the rear suspension assembly comprising:
 a left slide rail;
 a right slide rail;
 at least one suspension arm pivotally connected to one of the left and right slide rails and pivotally connected to the chassis;
 a shock absorber connected between the chassis and the one of the left and right slide rails;
 a limiter strap extending between the chassis and the one of the left and right slide rails, the limiter strap being substantially inextensible to limit separation between the one of the left and right slide rails and the chassis;
 a strap holder connected between an end of the limiter strap and one of:
  the one of the left and right slide rails, and
  the chassis,
 the strap holder being moveable between a first holder position and a second holder position, a position of the end of the limiter strap being different in the first strap holder position compared to the second strap holder position;
a control cable having a first end operatively connected to the strap holder of the rear suspension assembly;
a strap adjustment actuator operatively connected to a second end of the control cable, the strap adjustment actuator being disposed forward of the at least one seat, the strap adjustment actuator being operable by a user during operation of the vehicle,
the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions; and
a biasing member,
 a first end of the biasing member being operatively connected to the strap holder, moving the strap holder toward the second strap holder position compressing the biasing member, the biasing member biasing the strap holder toward the first strap holder position.

2. The vehicle of claim 1, wherein when the limiter strap is taut:
the strap holder is prevented from moving from the first strap holder position to the second strap holder position; and
the strap holder is prevented from moving from the second strap holder position to the first strap holder position.

3. The vehicle of claim 1, wherein:
the biasing member is a torsion spring having a torsion axis; and
a first end of the torsion spring is connected to the strap holder.

4. The vehicle of claim 1, further comprising:
a rotating cylinder connected to the first end of the control cable on a first side of the rotating cylinder;

a lever having a first end and a second end, the first end of the lever being connected to a second side of the rotating cylinder; and a rigid member having a first end and a second end, the first end of the rigid member being connected to the second end of the lever, the second end of the rigid member being connected to the strap holder.

5. The vehicle of claim 4, wherein:

the chassis includes a tunnel, the rear suspension assembly being connected the tunnel; and the rotating cylinder is received in an opening in a side wall of the tunnel, the rotating cylinder extending at least partially into an interior of the tunnel.

6. A vehicle, comprising:

a chassis;

at least one seat connected to the chassis;

a motor connected to the chassis;

an endless drive track disposed below the chassis, the endless drive track being operatively connected to the motor for propulsion of the vehicle;

a rear suspension assembly supporting the endless drive track, the rear suspension assembly comprising:
 a left slide rail;
 a right slide rail;
 at least one suspension arm pivotally connected to one of the left and right slide rails and pivotally connected to the chassis;
 a shock absorber connected between the chassis and the one of the left and right slide rails;
 a limiter strap extending between the chassis and the one of the left and right slide rails, the limiter strap being substantially inextensible to limit separation between the one of the left and right slide rails and the chassis;
 a strap holder connected between an end of the limiter strap and one of:
  the one of the left and right slide rails, and
  the chassis,
 the strap holder being moveable between a first holder position and a second holder position, a position of the end of the limiter strap being different in the first strap holder position compared to the second strap holder position;

a control cable having a first end operatively connected to the strap holder of the rear suspension assembly;

a strap adjustment actuator operatively connected to a second end of the control cable, the strap adjustment actuator being disposed forward of the at least one seat, the strap adjustment actuator being operable by a user during operation of the vehicle, the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions; and a handlebar connected to the chassis,
  the strap adjustment actuator being a twist grip actuator disposed on the handlebar,
  the twist grip actuator being movable between at least the first actuator position and the second actuator position by twisting the twist grip actuator about the handlebar.

7. The vehicle of claim 6, further comprising:

a left handle disposed on a left side portion of the handlebar;

a brake lever disposed on the left side portion, the brake lever being connected to a brake fluid reservoir, the brake fluid reservoir being connected to the handlebar rightward of the left handle;

a right handle disposed on a right side portion of the handlebar;

a throttle lever disposed on the right side portion, a left end portion of the throttle lever being connected to the handlebar leftward of the right handle; and wherein the twist grip actuator is disposed between one of:
 the left handle and the brake fluid reservoir, and
 the right handle and the left end portion of the throttle lever.

8. The vehicle of claim 6, further comprising:

a handle disposed on a side portion of the handlebar; and wherein the twist grip actuator is disposed on the handlebar laterally inward of the handle.

9. The vehicle of claim 8, wherein the twist grip actuator is less than 5 cm from a laterally inward edge of the handle.

10. The vehicle of claim 6, further comprising:

a handlebar riser disposed between the handlebar and the chassis; and at least one body panel connected to the chassis; and wherein:
 the control cable runs from the twist grip actuator, along the handlebar, along the handlebar riser and in an interior of the at least one body panel to the strap holder.

11. A vehicle, comprising:

a chassis;

at least one seat connected to the chassis;

a motor connected to the chassis;

an endless drive track disposed below the chassis, the endless drive track being operatively connected to the motor for propulsion of the vehicle;

a rear suspension assembly supporting the endless drive track, the rear suspension assembly comprising:
 a left slide rail;
 a right slide rail;
 at least one suspension arm pivotally connected to one of the left and right slide rails and pivotally connected to the chassis;
 a shock absorber connected between the chassis and the one of the left and right slide rails;
 a limiter strap extending between the chassis and the one of the left and right slide rails, the limiter strap being substantially inextensible to limit separation between the one of the left and right slide rails and the chassis;
 a strap holder connected between an end of the limiter strap and one of:
  the one of the left and right slide rails, and
  the chassis,
 the strap holder being moveable between a first holder position and a second holder position, a position of the end of the limiter strap being different in the first strap holder position compared to the second strap holder position;

a control cable having a first end operatively connected to the strap holder of the rear suspension assembly;

a strap adjustment actuator operatively connected to a second end of the control cable, the strap adjustment actuator being disposed forward of the at least one seat, the strap adjustment actuator being operable by a user during operation of the vehicle, the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions; and a handlebar connected to the chassis, the strap adjustment actuator being a lever actuator disposed on the handlebar, the lever actuator being movable between at least the first actuator position and the second actuator position by at least one of:
pushing the lever actuator, and
pulling the lever actuator.

12. A vehicle, comprising:
a chassis;
at least one seat connected to the chassis;
a motor connected to the chassis;
an endless drive track disposed below the chassis, the endless drive track being operatively connected to the motor for propulsion of the vehicle;
a rear suspension assembly supporting the endless drive track, the rear suspension assembly comprising:
a left slide rail;
a right slide rail;
at least one suspension arm pivotally connected to one of the left and right slide rails and pivotally connected to the chassis;
a shock absorber connected between the chassis and the one of the left and right slide rails;
a limiter strap extending between the chassis and the one of the left and right slide rails, the limiter strap being substantially inextensible to limit separation between the one of the left and right slide rails and the chassis;
a strap holder connected between an end of the limiter strap and one of:
the one of the left and right slide rails, and
the chassis,
the strap holder being moveable between a first holder position and a second holder position, a position of the end of the limiter strap being different in the first strap holder position compared to the second strap holder position;
a control cable having a first end operatively connected to the strap holder of the rear suspension assembly;
a strap adjustment actuator operatively connected to a second end of the control cable, the strap adjustment actuator being disposed forward of the at least one seat, the strap adjustment actuator being operable by a user during operation of the vehicle,
the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions; and
at least one body panel connected to and disposed above the chassis,
the strap adjustment actuator being connected to the at least one body panel.

13. A vehicle, comprising:
a chassis;
at least one seat connected to the chassis;
a motor connected to the chassis;
an endless drive track disposed below the chassis, the endless drive track being operatively connected to the motor for propulsion of the vehicle;
a rear suspension assembly supporting the endless drive track, the rear suspension assembly comprising:
a left slide rail;
a right slide rail;
at least one suspension arm pivotally connected to one of the left and right slide rails and pivotally connected to the chassis;
a shock absorber connected between the chassis and the one of the left and right slide rails;
a limiter strap extending between the chassis and the one of the left and right slide rails, the limiter strap being substantially inextensible to limit separation between the one of the left and right slide rails and the chassis;
a strap holder connected between an end of the limiter strap and one of:
the one of the left and right slide rails, and
the chassis,
the strap holder being moveable between a first holder position and a second holder position, a position of the end of the limiter strap being different in the first strap holder position compared to the second strap holder position;
a control cable having a first end operatively connected to the strap holder of the rear suspension assembly;
a strap adjustment actuator operatively connected to a second end of the control cable, the strap adjustment actuator being disposed forward of the at least one seat, the strap adjustment actuator being operable by a user during operation of the vehicle,
the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions; and
a handlebar riser connected to the chassis,
wherein the strap adjustment actuator being disposed on the handlebar riser.

14. The vehicle of claim 1, further comprising:
at least one body panel; and
wherein a portion of the control cable is disposed in an interior side of the at least one body panel.

15. The vehicle of claim 1, wherein the strap holder is connected between the end of the limiter strap and one of the at least one suspension arm.

16. A snowmobile, comprising:
a chassis,
the chassis including a tunnel;
at least one seat connected to the chassis;
a motor connected to the chassis;
an endless drive track disposed below the chassis, the endless drive track being operatively connected to the motor for propulsion of the vehicle;
a rear suspension assembly supporting the endless drive track, the rear suspension assembly being connected to the tunnel, the rear suspension assembly comprising:
a left slide rail;
a right slide rail;

at least one suspension arm pivotally connected to one of the left and right slide rails and pivotally connected to the chassis;

a shock absorber connected between the chassis and the one of the left and right slide rails;

a limiter strap extending between the chassis and the one of the left and right slide rails, the limiter strap being substantially inextensible to limit separation between the one of the left and right slide rails and the chassis;

a strap holder connected between an end of the limiter strap and one of:
the one of the left and right slide rails, and
the chassis,
the strap holder being disposed in an interior of the tunnel,
the strap holder being moveable between a first holder position and a second holder position, a position of the end of the limiter strap being different in the first strap holder position compared to the second strap holder position;

a control cable having a first end operatively connected to the strap holder of the rear suspension assembly, the control cable being disposed on an exterior side of a tunnel wall of the tunnel;

a strap adjustment actuator operatively connected to a second end of the control cable, the strap adjustment actuator being disposed forward of the at least one seat, the strap adjustment actuator being operable by a user during operation of the vehicle, the strap adjustment actuator being operatively connected to the strap holder via the control cable, the strap adjustment actuator being movable between a plurality of actuator positions, the plurality of actuator positions including at least a first actuator position and a second actuator position, a position of the strap holder being related to a selected one of the plurality of actuator positions;

a front right ski connected to a front right portion of the chassis; and a front left ski connected to a front left portion of the chassis.

17. The snowmobile of claim 16, further comprising:
at least one body panel; and
wherein:
the tunnel includes at least one tunnel side wall; and
the control cable runs from the strap adjustment actuator, into an interior of the at least one body panel and along an exterior of the at least one tunnel side wall.

18. The snowmobile of claim 16, wherein:
the at least one seat includes a straddle seat disposed on the chassis; and
wherein the strap holder actuator is disposed forward of the straddle seat.

* * * * *